(12) United States Patent
King et al.

(10) Patent No.: US 7,024,551 B2
(45) Date of Patent: Apr. 4, 2006

(54) METHOD AND APPARATUS FOR UPDATING BOOT CODE USING A SYSTEM CONTROLLER

(75) Inventors: James E. King, Wokingham (GB); Paul J. Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 476 days.

(21) Appl. No.: 10/337,499

(22) Filed: Jan. 7, 2003

(65) Prior Publication Data

US 2004/0133771 A1 Jul. 8, 2004

(51) Int. Cl.
G06F 9/24 (2006.01)

(52) U.S. Cl. .......................................... 713/2; 714/724
(58) Field of Classification Search ...................... None
See application file for complete search history.

(56) References Cited

U.S. PATENT DOCUMENTS

| | | | | |
|---|---|---|---|---|
| 5,157,701 A | * | 10/1992 | Parker | 377/39 |
| 5,214,753 A | * | 5/1993 | Lee et al. | 345/610 |
| 5,805,882 A | * | 9/1998 | Cooper et al. | 713/2 |
| 5,963,936 A | * | 10/1999 | Cochrane et al. | 707/3 |
| 6,467,009 B1 | * | 10/2002 | Winegarden et al. | 710/305 |
| 6,570,546 B1 | * | 5/2003 | Welker et al. | 345/1.1 |
| 6,665,813 B1 | | 12/2003 | Forsman et al. | |
| 6,754,828 B1 | | 6/2004 | Marisetty et al. | |
| 6,823,435 B1 | | 11/2004 | Wisor | |
| 6,834,384 B1 | | 12/2004 | Fiorella, III et al. | |

FOREIGN PATENT DOCUMENTS

| | | |
|---|---|---|
| WO | 00/52570 | 9/2000 |
| WO | WO 00/52570 | 9/2000 |

OTHER PUBLICATIONS

International search report application No. GB0328646.5 mailed Apr. 29, 2004.

* cited by examiner

*Primary Examiner*—Lynne H. Browne
*Assistant Examiner*—Anand B. Patel
(74) *Attorney, Agent, or Firm*—Meyertons Hood Kivlin Kowert & Goetzel, P.C.; B. Noël Kivlin

(57) ABSTRACT

Method and apparatus are disclosed that allow boot code within the apparatus to be updated using a system controller. The apparatus includes a central processing unit (CPU) and a programmable memory that contains boot code at a predetermined location for use in booting the CPU. The apparatus further includes a bus and a bus master for the bus. The CPU accesses the boot code via the bus and the bus master. The apparatus further includes a system controller. This is operable to write boot code into the programmable memory over the bus. In one embodiment, the above components form a single subsystem within an array of such subsystems. A single control point for the array can transmit updated boot code to the system controller for loading into the programmable memory. This then provides a single interface for simultaneously updating the boot code in all subsystems.

56 Claims, 13 Drawing Sheets

METHOD AND APPARATUS FOR UPDATING BOOT CODE USING A SYSTEM CONTROLLER

FIELD OF THE INVENTION

The present invention relates to computer systems and such-like, and more particularly to the use of a system controller for updating CPU boot code in such systems.

BACKGROUND OF THE INVENTION

A significant trend in modern computing is for commercial organisations to rent or lease processing resources, and especially Web server capacity, from a service provider, rather than using their own in-house systems. Typically the computer systems are owned and operated by the service provider, but are then used to run various applications as required by the commercial organisations.

A major advantage of this approach for the commercial organisation is that it allows them much more flexibility, especially if their system demands are liable to significant fluctuations on a relatively short timescale. This can often be the case, for example, if a special advertising promotion is being run. This will (hopefully) generate an intense peak of on-line inquiries, orders, and so on. The commercial organisation temporarily acquires the additional computing power to cope with this increase by leasing or renting capacity from the service provider.

Usually a service provider will be hosting multiple applications at the same time, on behalf of one or more organisations. A typical installation for a service provider has multiple computing systems, each comprising one or more domains. Each domain has processing facilities that are largely independent from other domains, and each runs its own operating system.

The advantage of the multi-domain structure is that it provides a flexible and scalable architecture. Thus typically a domain runs only one application at a time. In cases of high demand, multiple domains can then be assigned to the same application (or more accurately, a separate copy of the same application can be run in multiple, different domains) in order to satisfy this demand. Conversely, multiple applications having low priority may in some situations run in parallel on a single domain. This approach is also robust, in that if one particular domain fails, then its processing can be reassigned to one or more other domains.

An important consideration in the operation of such systems is ease of reconfiguration. Thus it can be necessary to assign resources (i.e. domains) from one application to another application relatively quickly in order to meet real-time shifts in demand. An example of where this situation might arise is when the demand for a particular task (such as responding to requests for a given Web site) is significantly greater than anticipated (or indeed a lot less than anticipated). This may involve a re-boot of the relevant domain, for example if the new application is to run on a different operating system from the previous application. It will be appreciated that having to perform such re-configuration for each individual domain represents a time-consuming task.

A further concern for the service provider relates to the security of their systems. Thus the applications that are being run are frequently supplied from the commercial organisation renting or leasing the system. Staff from this organisation may desire some form of management or administrative control over the running of the applications, in order to make real-time changes. Thus if this organisation is running multiple applications across a set of domains, it may want to take responsibility for deciding how many domains to allocate at any given time to a particular application. It may also be desired to modify system behaviour in response to a change in circumstances. For example, if a problem appears in the operation of a particular application, it may be desired to start this application up in one domain in debug mode, in order to try to resolve the problem as quickly as possible.

On the other hand however, the service provider generally wants to restrict the ability of its customers to reconfigure the domains. For example, there is a risk that such reconfiguration might possibly result in the boot code becoming corrupted. If this prevents the system from booting, then there is no software mechanism available to further modify or correct the boot code (since the system cannot initialise itself properly). Furthermore, it is difficult to maintain a reserve or fallback boot code, in that by convention CPUs are generally designed to load boot code from a single, predetermined location. Consequently, corruption of the boot code typically requires an expensive hardware replacement in order to restore a workable boot code to the system.

SUMMARY OF THE INVENTION

Thus in accordance with one embodiment of the present invention, there is provided apparatus comprising: a central processing unit (CPU), a programmable memory containing boot code at a predetermined location for use in booting the CPU, a bus, a bus master for the bus, and a system controller. The CPU accesses the boot code via the bus and the bus master, and the system controller is operable to write boot code into the programmable memory over the bus. In one particular embodiment, the bus in the apparatus is an ISA bus, but other buses could be used instead (e.g. PCI, X bus, etc.).

Such an approach provides an alternative, out-of-band mechanism for writing or updating the boot code, which bypasses the CPU. This provides increased flexibility and robustness, in that the system controller is now able to modify the boot code. There can be various reasons for wanting to update the boot code in this manner. For example, there may be an upgraded version of the boot code, having bugs corrected, or operating at faster speed, or supporting some new network protocol (for example, an upgrade from IP v4 to IP v6). It may also be desired to modify the set of locations from which the operating system is loaded (e.g. to enable or to disable network installation).

In one particular implementation, a reset link is provided between the system controller and the bus master. The system controller is then able to use this reset link to hold the bus master in reset when writing the boot code into the programmable memory over the bus. This then prevents any danger of a collision between a bus transaction initiated by the bus master, and the boot code being written over the bus by the system controller. The system controller may optionally be provided with a reset link to the CPU. This then allows the system controller to hold the CPU in reset when writing the boot code into the programmable memory over the bus. In other words, the system controller can load new boot code into the memory, and then, on releasing the CPU from reset, cause the CPU to boot using the newly provided boot code. On the other hand, the CPU may be allowed to continue operating while the system controller is updating the boot code in the memory. This is feasible providing the CPU does not want to use the bus (since the bus master is being held in reset). The newly loaded boot code will then be accessed by the CPU the next time the system is powered up or rebooted.

In one particular embodiment, a buffer is incorporated into the bus. This receives a control signal from the system controller that indicates when the boot code is being updated. If an update is not in progress, then the presence of the buffer on the bus is transparent to the bus master and to any other devices attached to the bus. On the other hand, when the system controller is updating the boot code in memory, its signals to the buffer to isolate the bus master from at least some of the signals placed onto the bus by the system controller. The reason for this is that the bus master does not normally expect other devices to write to the bus, and so such write signals may cause electrical problems on the bus master. The buffer therefore allows the boot code to be written onto the portion of the bus that connects to the memory, without such signals clashing with those from the bus master.

It will be appreciated that in some embodiments, the bus master may be provided with some protection on its outputs, for example tri-state buffers that can be held in their high impedance state upon reset. If this is the case, then the use of the buffer such as described above is not generally needed. On the other hand, providing such tri-state output buffers is relatively expensive, and so these are unlikely to be present on all the outputs of the bus master. In particular, they are typically only present on the data lines, since these are bi-directional to support read and write operations, rather than the address and control lines, which are under the control of the (single) bus master. In such circumstances, the buffer may be located only on address and control lines of the bus (since these are the lines potentially vulnerable to damage). It will be appreciated that one way for the buffer to provide isolation for the bus master is for the buffer itself to have tri-state buffering on its outputs.

In one particular embodiment, the buffer supports a JTAG interface (JTAG is an industry standard interface, specified by IEEE 1149.1). This interface is attached to a set of JTAG control lines from the system controller. In accordance with the JTAG standard, these control lines allow the system controller to write specific data to the output of the buffer (in contrast to the system controller writing directly onto the bus). As above, the buffer is transparent to the other bus devices during normal operations, but when commanded by the system controller (i.e. when the bus master is held in reset), the buffer again isolates the bus master from signals between the buffer and memory.

In this embodiment, the route for writing the boot code into the memory from the system controller is via the JTAG control lines, the JTAG buffer, and then the bus, rather than the system controller writing directly onto the bus. One significant advantage of using this route is that the number of output pins on the system controller is greatly reduced (thereby helping to conserve costs). For example, a typical bus interface might require 30 pins, whereas a JTAG control link may be implemented with just 4 pins.

It will be appreciated that the JTAG buffer may be inserted into both the data and address/control lines of the bus, or just the address/control lines. In the latter case, when writing the boot code to memory, the system controller will specify address outputs using the JTAG interface, but will place the corresponding data directly onto the bus itself. Since the number of address pins frequently outnumbers the number of data pins, this can still represent a significant saving in terms of pins on the system controller. (Again, it is assumed for this particular embodiment that the bus master has protective buffering on the data lines, but not on the address and control lines).

In an alternative embodiment, the buffer is replaced by a program logic device (PLD), which has a link to the system controller for receiving a control signal. The operation of the PLD is broadly similar to the buffer, in that the system controller instructs the PLD to operate in a transparent manner on the bus during normal operations, so that its presence is not noticed by the other devices on the bus. In addition, when the bus master is held in reset, the system controller instructs the PLD to isolate the bus master from signals on the bus between the PLD and the memory. At the same time, the system controller sends the PLD control signals so as to write the boot code onto the bus and into the memory.

As with the JTAG buffer, the PLD may be inserted into both the data and address/control lines of the bus, or just the address/control lines. In the latter case, when writing the boot code to memory, the system controller will specify address outputs via the PLD, but will place the actual data (i.e. the boot code) directly onto the bus itself. Again, the use of a PLD can help to save a significant number of pins on the system controller (even if the PLD only extends across the address lines), since the control line can be designed to use just one pin, or at least a relatively small number of pins.

In one embodiment, the boot code is stored in static random access memory (SRAM), rather than a (programmable) ROM, such as flash memory, which has more usually been used for storing boot code. The use of SRAM for this has the advantage that SRAM is both faster and cheaper than PROM. By loading the boot code afresh for each restart, modification of the boot code is now relatively straightforward, in that the system can be commanded to load the updated boot code. (This should be contrasted with having to modify boot code stored in fixed PROM in existing systems, which is a relatively high risk operation, since if the PROM code is accidentally corrupted or otherwise becomes unusable, a hardware replacement is typically required for the system to boot).

In one particular embodiment, the SRAM also serves as a scratchpad memory for use by the CPU during booting. In existing systems, this scratchpad is typically implemented by a separate SRAM, so combining both the boot storage device and also the scratchpad into a single SRAM represents a hardware simplification and potential cost reduction. In order to avoid data in the scratchpad overwriting the boot code, the SRAM is logically divided into two regions, a first region for storing boot code and a second region for use as the scratchpad memory.

Note that a typical CPU expects to find both the boot code device and also the scratchpad device at predetermined (different) locations. The combined SRAM can then be installed at the predetermined location for one of these devices, with transactions for the other device being intercepted and diverted to the combined SRAM. This diversion may be accomplished by the above-mentioned PLD (if used), or by any other suitable approach.

In one particular embodiment, the combined SRAM is placed at the predetermined location for the boot code storage device. In this case, bus transactions for the boot code device will operate as normal, but bus transactions for the scratchpad are diverted to the combined SRAM, and more particularly to the second region of the SRAM. This can be done by incrementing addresses corresponding to within the scratchpad by a fixed increment. This increment (which may of course be negative) is typically formed by combining two offsets, the first representative of the difference in (expected) base address between the boot storage device and the scratchpad, and the second representative of the offset of the second region of the combined SRAM from the base address of the combined SRAM. Note that in this manner, the combined SRAM can be regarded as acting natively as the boot code device, and emulating the operation of the SRAM scratchpad.

An apparatus such as described above is typically incorporated as a subsystem into a larger computing system that contains multiple such subsystems. The computing system also has a service processor that is linked to the system controller on each subsystem. This then provides a centralised mechanism for the service processor to write or to update the boot code in multiple subsystems.

Thus in a typical implementation, an administrator or other system management user runs a configuration utility on the service processor. From this single control point, the user can specify the boot code to be used on a set of subsystems (rather than having to do this separately for each individual subsystem). The desired boot code is either stored on the service processor itself, or at a location accessible to it (for example, over some network). The service processor can then obtain this boot code, and transmit it over the respective links to each system controller, along with the command to write this boot code into the memory for the subsystem. Note that this command may be accompanied with an instruction to reset the system, thereby causing an immediate re-boot with the new boot code (once loaded into memory). Alternatively, the new boot code may simply be loaded into memory at this point, for utilisation whenever the system is next rebooted.

In accordance with another embodiment of the invention, there is provided a method of operating apparatus comprising a central processing unit (CPU), a programmable memory, a bus, a bus master for the bus, and a system controller. The method comprises the system controller writing boot code into a predetermined location of the programmable memory over the bus; and the CPU accessing the boot code from the programmable memory via the bus master and the bus in order to boot up.

In accordance with another embodiment of the invention, there is provided a method of operating apparatus comprising a service processor and multiple computing subsystems. Each subsystem includes a central processing unit (CPU), a programmable memory, a bus, a bus master for the bus, and a system controller. The method begins with transmitting boot code from the service processor to each of the system controllers. The system then writes the received boot code into a predetermined location of the programmable memory of the subsystem over the bus. This boot code is then accessed by the CPU from the programmable memory via the bus master and the bus in order to boot the CPU.

In accordance with another embodiment of the invention, there is provided a computer program product comprising instructions in machine-readable form on a medium. The instructions are loadable into a service processor of a computing apparatus that comprises multiple computing subsystems. Each subsystem includes a central processing unit (CPU), a programmable memory, a bus, a bus master for the bus, and a system controller. The instructions cause the service processor to run a configuration utility that allows a user to specify the boot code for the multiple subsystems in a single operation. Note that this operation may comprise multiple steps, but it is performed for the subsystems as a group, rather than having to repeat the operation for each subsystem. Subsequently, the specified boot code is transmitted from the service processor to each of the system controllers, along with instructions for the system controllers to write the received boot code into a predetermined location of the programmable memory of the subsystem over the bus. This then renders the boot code accessible by the CPU from the programmable memory via the bus master and the bus, in order to boot the CPU.

Such program instructions are typically stored on a hard disk of a computer system, and loaded for use into random access memory (RAM) for execution by the service processor. Note that rather than being stored on the hard disk or other form of fixed storage, part or all of the program instructions may also be stored on a removable storage medium, such as an optical (CD ROM, DVD, etc) or magnetic (floppy disk, tape, etc) device. Alternatively, the program instructions may be downloaded via a transmission signal medium over a network, for example, a local area network (LAN), the Internet, and so on.

It will be appreciated that the method and computer program product embodiments of the invention will generally benefit from the same particular features as the apparatus embodiments of the invention.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
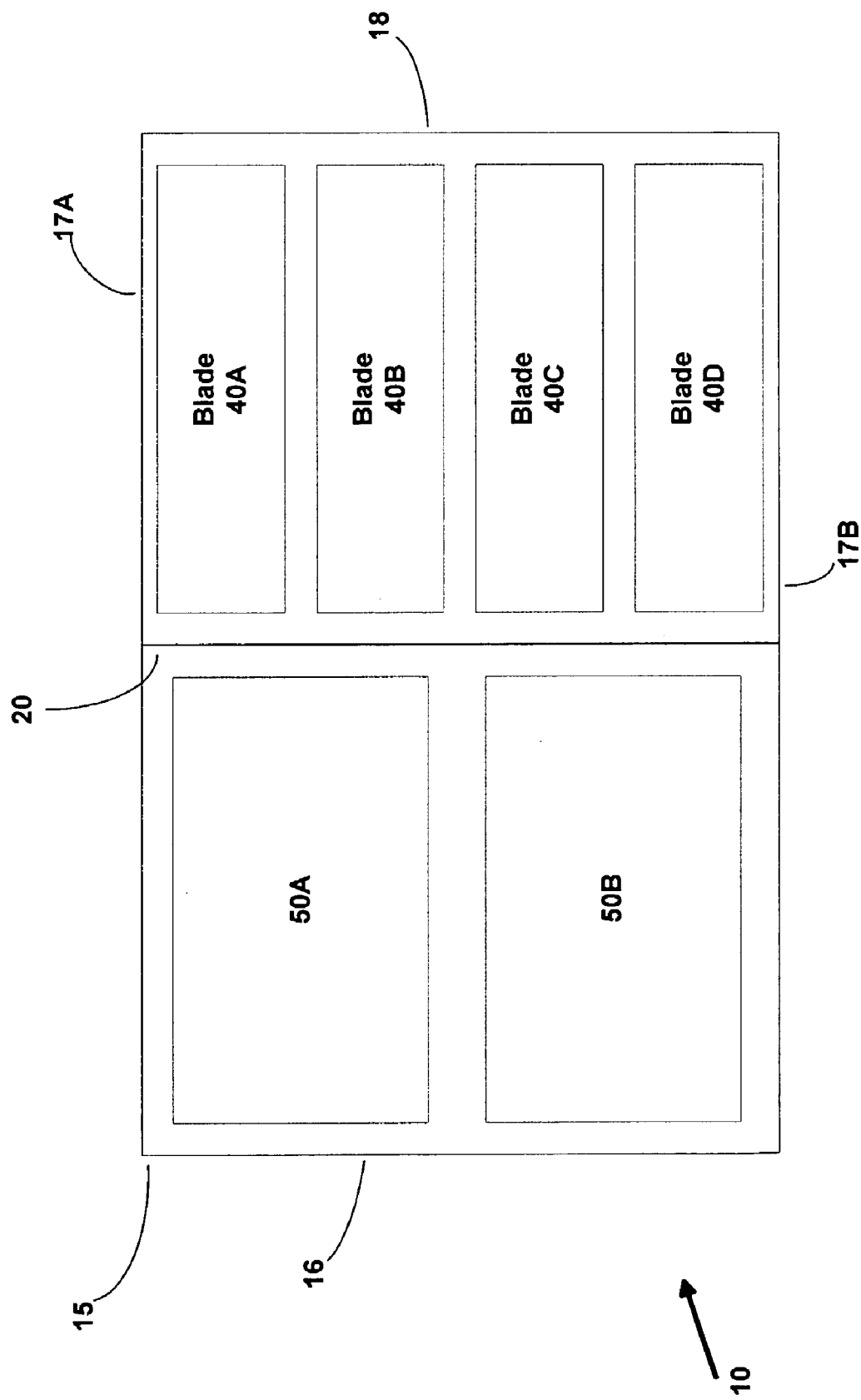
FIG. 1 is a schematic plan view of a shelf of a rack-mounted computer system in accordance with one embodiment of the invention.

FIG. 1 illustrates a rack-mounted computer system 10, which is typically utilised as a server machine. More particularly, FIG. 1 depicts a plan view of the contents of one shelf (it will be appreciated that system 10 may incorporate additional shelves), showing the frame or chassis 15 of computer system 10. The chassis 15 incorporates a midplane 20, which provides a set of connections between components in the front portion of the chassis and those in the rear portion of the chassis. (For orientation purposes, the front wall of the chassis is denoted in FIG. 1 by the reference numeral 18, and the rear wall by the reference numeral 16, with the side walls being marked as 17A and 17B).

The front portion of the chassis is occupied by four processing units known as blades, 40A, 40B, 40C and 40D, which provide the primary processing power of system 10. For clarity, FIG. 1 shows only four blades, but in one particular embodiment a shelf can accommodate up to 16 blades. It will be appreciated that in any given system, one or more blade unit slots may be empty, depending upon the particular computing requirements for that installation.

Each of the blade units 40 is generally similar, although there may be certain differences between them, for example in relation to the amount of memory provided on a particular blade. The blades 40 run independently of one another as separate domains, although groups of two or more blade units may be configured to run in combination for the same application. In this manner, system 10 provides a highly flexible computing resource. Furthermore, the presence of multiple blades provides protection against the failure of a blade unit, in that its processing tasks can then be transferred to one or more other blade units, if so desired.

Figure 2:
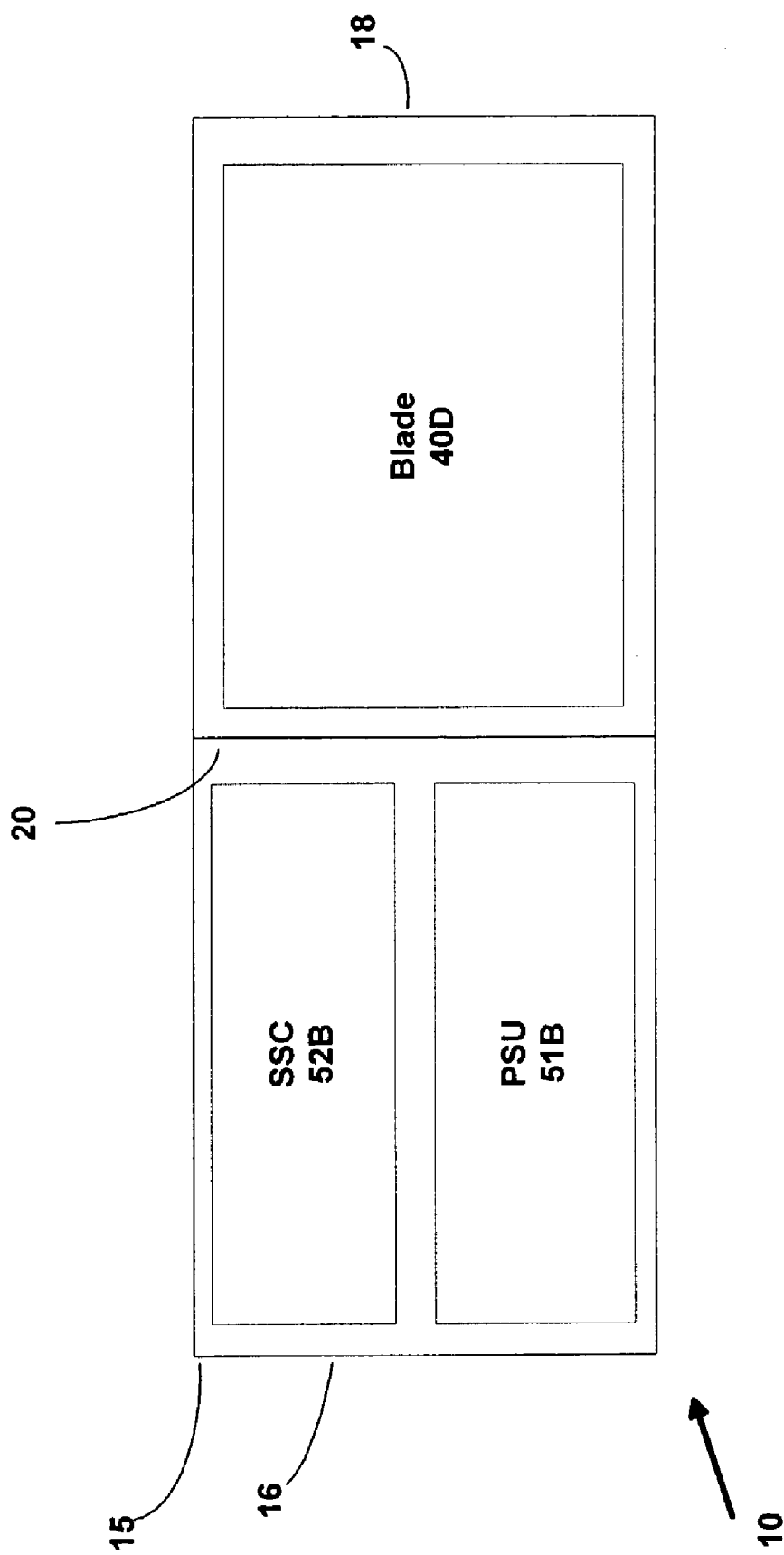
FIG. 2 is a side elevation view of the shelf of the rack-mounted computer of FIG. 1.

The rear portion of the chassis is occupied by the components denoted schematically in FIG. 1 as 50A and 50B. The arrangement of these components is seen more easily in FIG. 2, which is a side elevation of system 10, as if seen looking through side wall 17B. It will be apparent from FIG. 2 that space 50B is occupied by two separate devices, one located on top of the other. The lower device is a power supply unit (PSU) 51B, which provides power to the chassis and to the components therein. The upper component in the rear portion of the chassis is a switching and service controller (SSC) 52B, whose purpose will be described in more detail below.

Note that the chassis actually contains two power supply units 51A, 51B and two SSCs 52A, 52B. Thus there is one pairing of PSU 51B and SSC 52B located in block 50B, while a corresponding pairing of PSU 51A and SSC 52A is located in block 50A. (This latter pairing is hidden from view in FIG. 2). It will be appreciated that by duplicating both the PSU 51 and the SSC 52, the system 10 is provided with redundancy protection against the failure of any one of these units.

It will also be recognised that the particular server configuration of FIG. 1 is provided by way of example only, and that the skilled person is aware of a wide range of other potential arrangements and configurations for servers and for computer systems in general.

Figure 3:
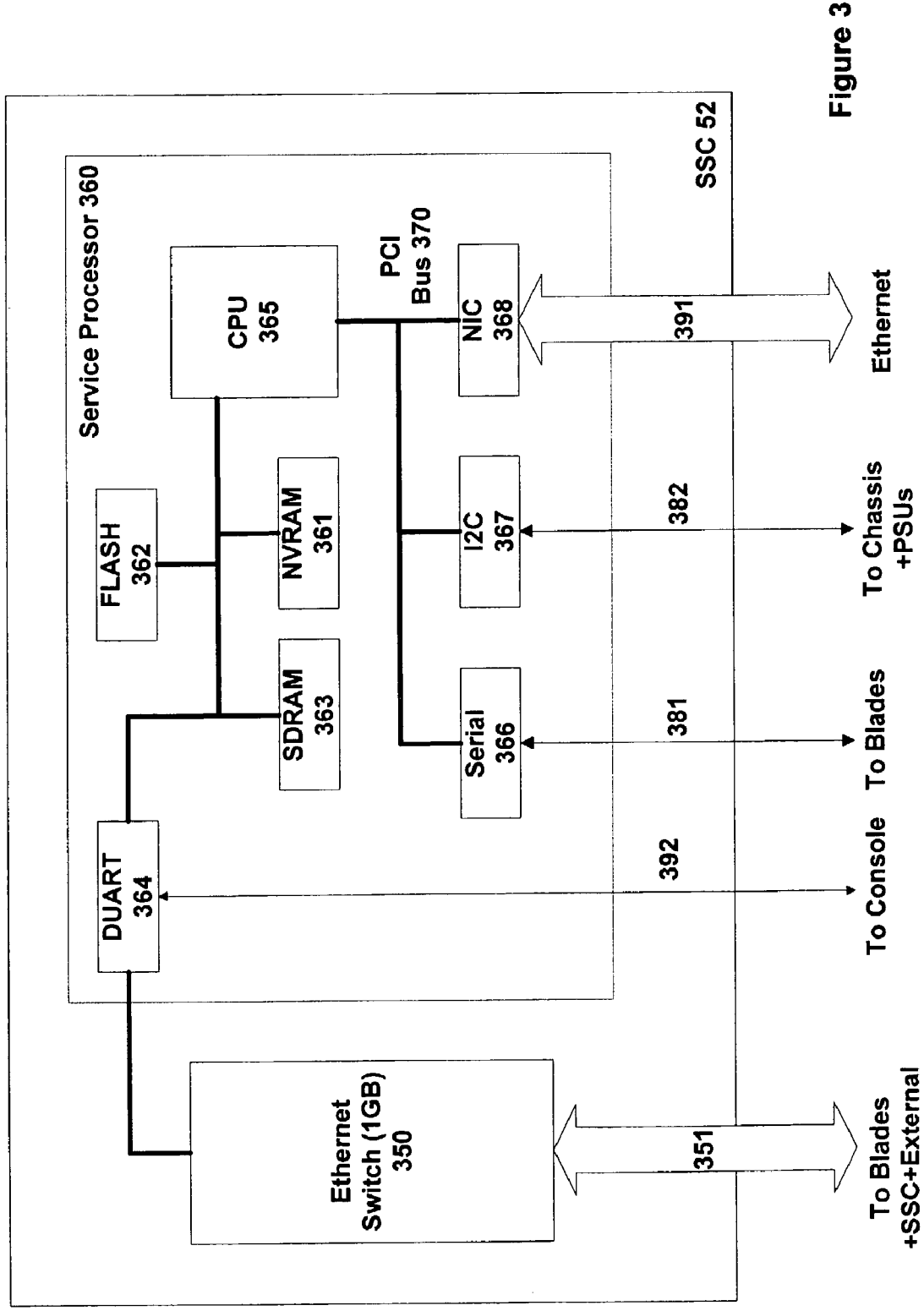
FIG. 3 is a block diagram of a switching and service controller as used in the rack-mounted computer system of FIGS. 1 and 2.

FIG. 3 illustrates the SSC 52 of system 10 in more detail. In one embodiment, the SSC comprises two main components, a 1 Gbit Ethernet switch facility 350 and a service processor 360. Each of these two components is formed as a separate printed circuit board (PCB), with the service processor PCB being mounted as a mezzanine PCB on the switch PCB 350. The Ethernet switch has an Ethernet connection 351 to the blades 40, to the other SSC, and also typically to an external network, such as the Internet (not shown in FIG. 3). The Ethernet switch 350 therefore allows data to be transmitted at a high capacity between the different blades 40 of system 10, as well as being transferred to or from the network. In normal operations, the Ethernet switches in both SSCs 52A, 52B are concurrently active (i.e. an active-active configuration), in order to provide maximum switching capacity. Note that the internal configuration of switch 350 is not shown in FIG. 3, since it is not directly relevant to an understanding of the present invention.

The other main component of the SSC 52 is the service processor 360. At the heart of the service processor 360 is a CPU 365, which in one particular embodiment is a PowerPC chip from Motorola Corporation. This is provided with synchronous dynamic random access memory (SDRAM) 363 and non-volatile random access memory (NVRAM) 361 to support its processing operations. Also connected to the CPU 365 is flash memory 362, which in one particular embodiment has a capacity of 16 Mbytes. This is used as a non-volatile store to hold the software to be executed by CPU 365, as well as other data. In particular, flash memory 362 typically stores a loader routine that allows the service controller 360 to boot up, an operating system, which in one embodiment is the VxWorks operating system, available from Wind River Systems Incorporated (see www.windriver.com), and a service control application that can be used for configuration and set-up.

The service processor 360 also includes a dual universal asynchronous receiver and transmitter (DUART) unit 364. This provides two serial connections from the service processor 360, the first providing a link 392 to an external console (not shown in FIG. 3), while the second is connected to the switch 350 (on the same SSC 52). The console allows a user to access various control and administration programs on the service processor, in order to manage operations of system 10. Thus the console can be used to configure the service processor 360, and through it also the individual blades 40.

Also shown in FIG. 3 is a PCI bus 370 that connects the CPU 365 to two bridge units. The first of these is a serial bridge 366, which is linked to a serial connection 381 that runs to each of the blade units 40. This is used by the service controller 360 to send appropriate commands to the blade units, and then to receive data and responses back from the blade units. The other bridge unit is an I2C bridge 367, which connects to an I2C link 382. The I2C link runs to the chassis and to each of the power supply units 51A, 51B. Note that I2C is an industry standard bus for obtaining diagnostic operating information, such as regarding temperatures and voltages, and was originally developed by Philips Electronics N.V. of the Netherlands. Further information about I2C is available at page /buses/i2c/ available from the site: www.semiconductors.philips.com.

In one particular embodiment, the pair of service processors 360A, 360B (corresponding to the service processor in SSC 52A and 52B respectively) operates in active-standby mode. In other words, at any given time, only one of the pair of service processors is actively monitoring the operation of system 10. The other (stand-by) service processor then monitors the active service processor, in order to ensure that it is operating properly. If a fault is detected in the active service processor, the stand-by service controller then takes over responsibility for monitoring the system 10 (i.e. the stand-by service processor becomes the active service processor).

The service processor 360 also includes a network interface card 368, which contains a link 391 to an Ethernet network. The service controller software supports a management network interface that exposes the diagnostic and operational information collected by the service controller 360 to external application programs. This external monitoring can be performed either from a console, over link 392, or from a remote system over link 391 and an attached network, such as the Internet (not shown in FIG. 3). This external management facility may be used to perform system configuration and administration tasks, such as determining which application will run on which blade, and so on.

Note that in FIG. 3, Ethernet link 351, serial link 381, and I2C link 382 are each shown, for simplicity, as single connections. However, it will be appreciated that in practice these links will be implemented by as many separate connections to their respective targets as appropriate.

Figure 4:
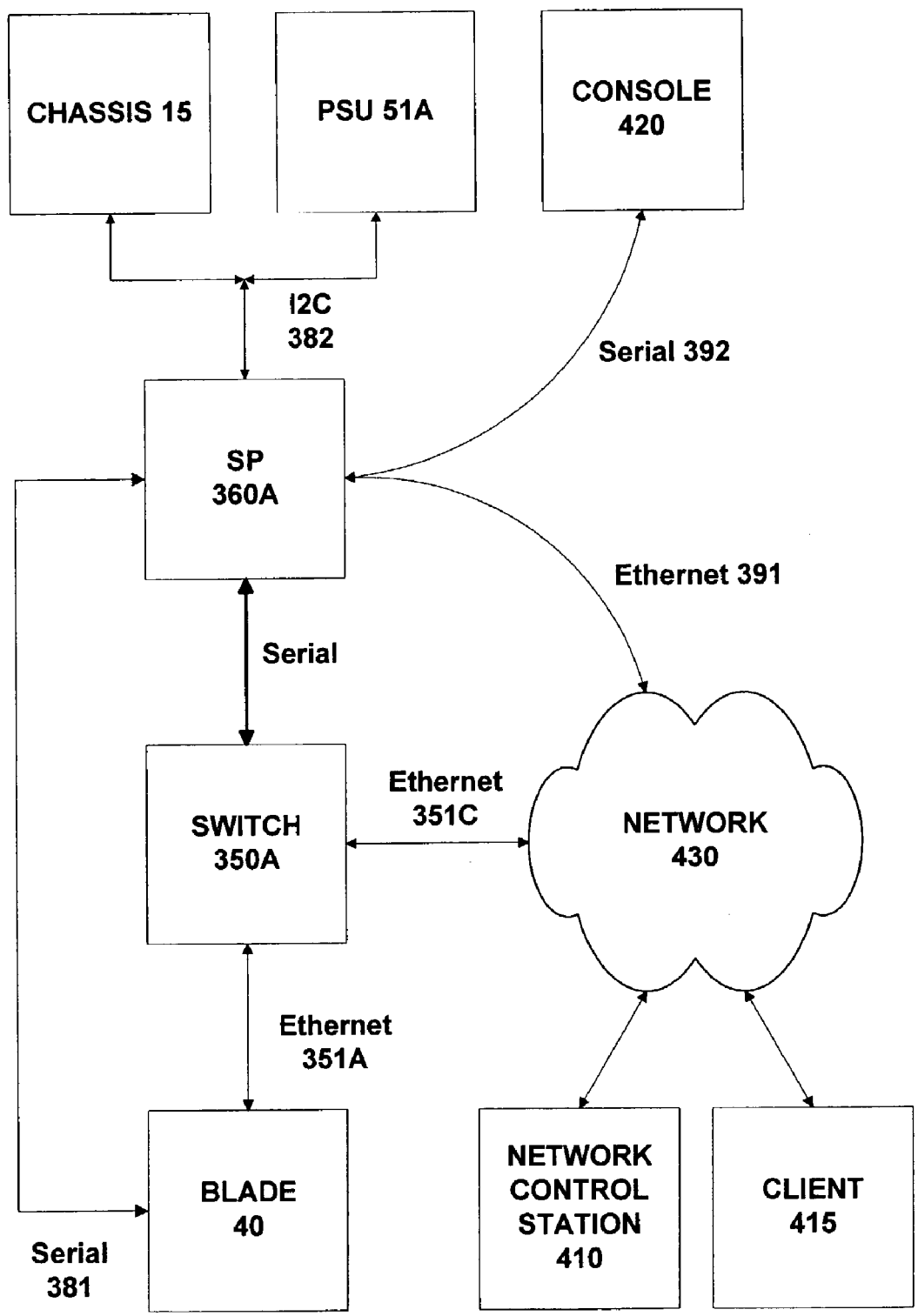
FIG. 4 is a diagram illustrating various connections involving components of the rack-mounted computer system of FIGS. 1 and 2.

FIG. 4 illustrates some of the connections involving system 10. Note that for simplicity, FIG. 4 only includes a single switch 350A, a single service processor 360A, a single PSU 51A, and also only a single blade 40. It will be appreciated that the connections of the omitted components generally mirror the connections of the corresponding components shown. For example, each blade 40 has an Ethernet connection 351A to switch 350A and a serial link 381 to service processor 360A. In addition (although not shown in FIG. 4), each blade 40 also has an Ethernet connection to switch 350B, and a serial link to service processor 360B. (Note that there are no links directly from one blade to another).

Switch 350A has a serial link to service processor 360A (i.e. the service processor in the same SSC, namely SSC 52A), and an Ethernet link 351C to an external network 430. Network 430 can represent any suitable form of network, such as the Internet, a corporate intranet or extranet, and so on. Switch 350A also has an Ethernet link to the other switch 350B (i.e. the switch on SSC 52B—not shown in FIG. 4), but there is no direct link from switch 360A to the service processor 360B on this other SSC 52B As shown in FIG. 4, a client 415 is attached to network 430 (only a single client is shown, but of course in practice the number of clients attached to network 430 may in fact be very large). In a typical installation, client 415 interacts via network 430, switch 350A, and Ethernet links 351A, 351C, with a Web server program running on blade 40, in order to exchange http requests and responses.

The service processor 360A is also provided with an Ethernet link 391 to network 430. As previously indicated this allows remote control and configuration of system 10 from a remote terminal, such as network control station 410. Note that in some implementations, the service processor 360A and the switch 350A may be connected to different networks. For example, the switch may be linked to the Internet, to act as a WorldWideWeb server, whereas for security reasons the service processor 360 may only be accessible from an internal network.

Also shown in FIG. 4 is a serial link from service processor 360A to console 420. This typically provides a local interface for controlling system 10 (as opposed to the use of network control station 410). Service processor 360A also includes a further serial link to the other service processor 360B (i.e. to the service processor on the other SSC, namely SSC 52B—not shown in FIG. 4). This link allows the stand-by service processor to monitor the operation of the currently active service processor, so that it can take over in the event of a fault. In addition, service processor 360A is also connected to the chassis 15 and power supply unit 50A by an I2C bus 382, for various control and diagnostic operations, as described above.

Figure 5:
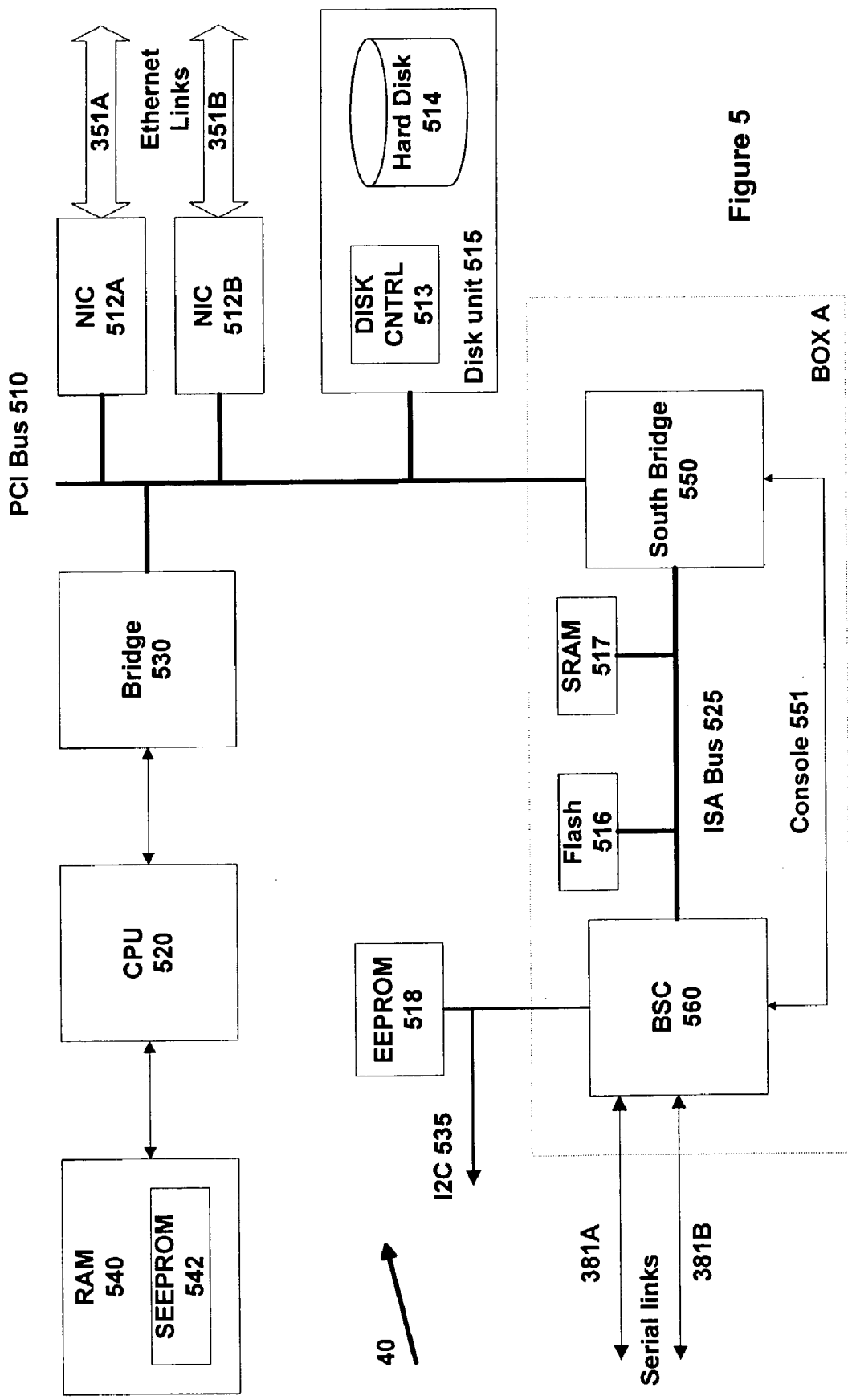
FIG. 5 is a block diagram of a blade unit as used in one implementation of the rack-mounted computer system of FIGS. 1 and 2.

FIG. 5 illustrates an example implementation of a blade 40. The overall functioning of the blade is generally managed by a CPU 520, which is connected to random access memory (RAM) 540. In one particular embodiment, RAM 540 is provided by up to four dual in-line memory modules (DIMMs). Associated with RAM 540 is a serially electrically erasable programmable read only memory (SEEPROM) 542.

The blade 40 also includes a blade service controller (BSC) 560. The BSC 560 provides control and management services for blade 40, and has a serial link to the service processor (see FIG. 3). In particular, serial link 381A runs to service processor 360A in one SSC 52A, while serial link 381B runs to the service processor 360B in the other SSC 52B. In this manner, whichever service processor 360 is currently active can use its respective serial link 381 to receive operational information from the blade 40, and to send appropriate control commands to the blade 40. Such commands may cause the BSC 560 to send various instructions to the CPU 520, in order to perform the operations desired by the service processor 360.

As well as serial links 381A, 381B, the BSC 560 is also linked to an I2C bus 535. This is used to monitor various operating parameters of the blade 40, such as temperature, voltage, and so on. The BSC 560 is then able to then report this information back over serial link 381 to the service processor 360, or at least to alert the service processor should the data received over the I2C link indicate that there is some anomalous condition on the blade 40. The BSC is further connected to electrically erasable programmable read only memory (EEPROM) 518.

The CPU 520 is attached via bridge 530 to a PCI bus 510. Attached to the PCI bus 510 are two network interface cards, 512A, 512B, each of which is connected via a respective Ethernet link to a corresponding switch 350. Thus link 351A connects the blade 40 to switch 350A on SSC 52A, while link 351B connects the blade to switch 350B on SSC 52B. These two cards therefore allow the blade 40 to transmit and receive data for normal processing operations, such as by exchanging data with other blades in system 10, or with devices such as client 415 on network 430.

Further attached to PCI bus 510 is a disk unit 515 comprising one or more hard disk drives 514 and an associated disk controller 513 (which may be integrated into the hard disk drive 514). Disk unit 515 provides local mass storage for code and data used by the blade 40. Note that such code and/or data may also be downloaded over a network link 351 for execution on CPU 520 and/or storage in disk unit 515, although in general faster access will be obtained if the desired material is already present locally on disk unit 515.

Blade 40 also incorporates a south bridge 550, which interfaces the PCI bus 510 to an ISA bus 525. The south bridge 550 also has a serial link 551 to the BSC 560 for providing a console input/output signal, which in turn is fed via serial link 381 to the service processor 360 (and from there to console 420 via serial link 392, as shown in FIG. 4).

Attached to the ISA bus 525 are the BSC 560, as previously discussed, plus flash memory 516 and static random access memory (SRAM) 517. The flash memory 516 (a form of EEPROM) is typically used to store the boot code for blade 40, and also its power-on self-test (POST) code. The boot code can be arranged to control whether the blade 40 loads an operating system and/or desired application from disk unit 515, or whether it downloads one or both of them over network link 351. Note however that the location of the boot code itself is generally fixed in memory (largely by convention). In other words, a typical CPU is designed to always look at start-up for the boot code at the same, predetermined location.

The SRAM 517 is used by the boot code as working memory (i.e. a form of scratchpad) during the boot process, for example, for storing data while testing RAM 540. Again, most CPUs expect this working memory to be always available at the same, predetermined location. Note that SRAM 517 is typically rather small, for example, 256 bytes, whereas the flash memory 516 to accommodate the boot code is often significantly larger, for example 1 Mbyte.

Figure 6:
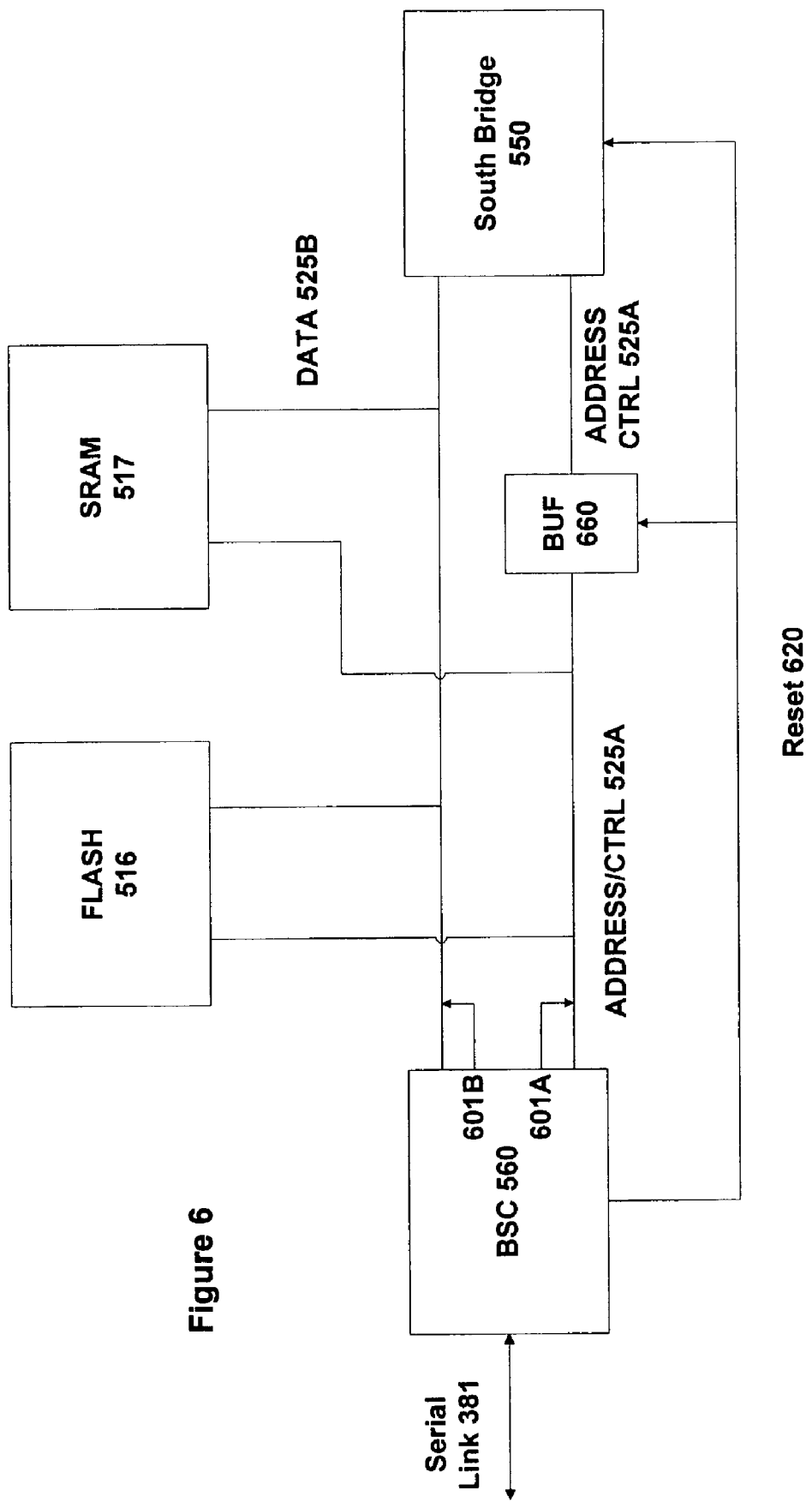
FIGS. 6 and 6A depict alternative embodiments of the particular portion of the blade unit of FIG. 5 involved with the boot process.

FIG. 6 illustrates in more detail the region of blade 40 that is schematically marked in FIG. 5 by the dotted line of box A, in accordance with one particular embodiment of the invention. Note that for simplicity, the console link 551 and the I2C bus 535 have been omitted from FIG. 6. (It will also be appreciated that Box A is simply used to denote the portion of FIG. 5 that is shown in FIG. 6, rather than having any intrinsic significance of its own).

FIG. 6 illustrates ISA bus 525 in more detail, including address and control lines 525A and data lines 525B. For a standard ISA bus, the address lines comprise twenty bits, the data lines comprise eight bits, and the control lines comprise two bits (i.e. address/control lines 525A in combination comprise twenty-two bits). The ISA bus has a single master, namely south bridge 550, which is responsible for initiating and controlling transactions on the bus.

In a known system, boot code stored in flash memory 516 can be updated by an appropriate configuration or set-up program running on CPU 520 (see FIG. 5). This stores the updated boot code into flash memory 516 via PCI bus 510 and south bridge 550. However, since the utility program on each blade 40 within system 10 will execute independently, this does not allow the flash memory 516 for all blades 40 in the system to be updated via a single control interface. Rather, each blade has to be updated in turn by running its own configuration utility.

A further problem with updating boot code in flash memory 516 is the risk that it becomes corrupted, or is updated in an unsuitable manner. If this occurs, and the system cannot boot at all, then the configuration utility on the CPU cannot be used to correct or revise the boot code. In this situation, a hardware replacement is generally needed to install new boot code.

Accordingly, the embodiment illustrated in FIG. 6 provides an alternative path for upgrading the boot code in flash memory 516. In particular, the implementation shown allows the BSC 560 to update flash memory 516 over bus 525. Note that such a facility is not supported by a conventional system, because as previously indicated, south bridge 550 is the bus master of ISA bus 525, rather than BSC 560. Hence BSC is unable to write transactions onto the bus 525.

In order to provide the desired functionality, in the embodiment of FIG. 6, BSC 560 incorporates additional outputs 601A and 601B, which are respectively linked to ISA address/control lines 525A and ISA data lines 525B. These additional outputs supplement the standard ISA bus connections of BSC 560 that are used by south bridge 550 to write transactions to the BSC, and so provide a mechanism for the BSC to send its own transmissions over ISA bus 525 to write boot code into flash memory 516.

It is important when BSC 560 is storing data into flash memory 516 over ISA bus 525 that this does not result in any conflict or collisions with a bus operation commanded by the bus master, namely south bridge 550. Therefore, a reset line 620 is provided from BSC 560 into south bridge 550. When the reset signal on line 620 is asserted, south bridge 550 is prevented from initiating any transactions over bus 525.

A further concern is that the address and data signals written by BSC 560 must not adversely affect the south bridge 550 itself. One approach is to protect all the outputs in south bridge 550, for example with tri-state buffers. At reset, these outputs can then be held in their high impedance state, thereby preventing any interference from the signals from BSC 560. However, most commercially available south bridge implementations only provide such tri-state buffering on the data line outputs, but not on the address/control line outputs. This is because only the data lines are bidirectional (to support read and write), and so may have data placed on them by other devices, whereas the address and control lines are controlled by the (single) bus master, i.e. south bridge 550.

Since therefore the south bridge 550 is not normally expecting any other devices to place address and control signals onto the bus, it is desirable to protect the south bridge against the address and control signals written onto the bus by BSC 560. Therefore, as shown in FIG. 6, a buffer 660 is inserted into the path of address/control lines 525A. In normal operations, i.e., when the reset signal is not asserted on line 620, this buffer is transparent. In other words, address and control commands are simply passed over bus 525 and through buffer 660 as if the buffer were not present.

However, when the reset signal is asserted by BSC 560, then buffer 660 acts to isolate the south bridge 550 from the address and control signals written onto address/control lines 525A by BSC output 601A. Typically, this is implemented by providing buffer 660 with its own tri-state buffers. These are then held in their high impedance state in response to the reset signal from the BSC on line 620 (which is received by buffer 660 in addition to south bridge 550). In this way, BSC 560 can now write data (i.e. boot code) into flash memory 516 without the risk of conflict with south bridge 550.

Figure 7:
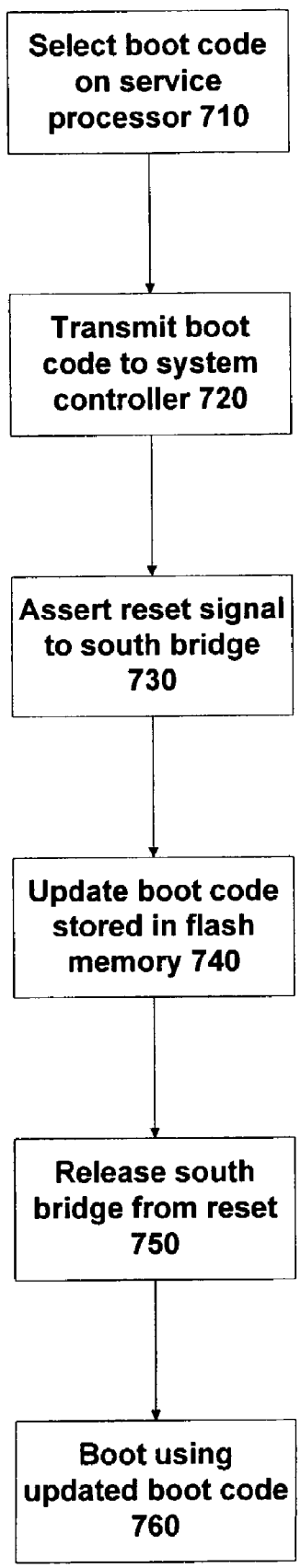
FIGS. 7 and 7A depict alternative methods for providing boot code to the blade unit of FIG. 5.

FIG. 7 is a flowchart depicting a typical set of operations for updating the boot code in flash memory 516. The process starts with the user interacting with some form of set-up or configuration utility running on the service processor 360, for example via console 420 or network control station 410 (see FIG. 4) to specify the boot code to be provided (step 710). This operation could be in response to the failure of a particular blade, in which case it may be desired to re-install the boot code into the blade. Alternatively, the user may desire to upgrade or to modify the boot code already installed in the blades in system 10, for example to correct a bug. In this latter case, the configuration utility typically allows the user to select multiple blades, and then supply the same upgrade to all of them (rather than having to upgrade each blade separately in turn).

It will be appreciated that for the system so far described, service processor 360 can only interact with the blades 40 within its own shelf or rack. Thus each rack (as a whole) would still typically have to be processed separately (if multiple racks were to be upgraded). Nevertheless, with perhaps sixteen blades per rack, performing an upgrade on a per rack basis, rather than on a per blade basis, this still represents a very significant saving. Moreover, one can envisage a further system management facility (e.g. running on network control station 410), that interacts simultaneously with multiple service processors, and therefore allows the boot code for one or more complete systems to be upgraded via a single configuration operation.

Once the relevant boot code has been specified, it is now transmitted from the service processor to each relevant system controller over respective serial links 381 (step 720). Note that this may involve the service processor first retrieving the boot code from some network location, perhaps as specified by the user, or the service processor may already have the boot code available (e.g. stored in flash memory 362, see FIG. 3).

Note that the updated boot code is being provided here out-of-band, in other words, over a dedicated control path 381, rather than via the normal data processing links into CPU 520 such as Ethernet connections 351. This has the advantage that it is generally a much more secure approach, since the service provider (i.e. the owner of system 10) can maintain strict control over the usage of service processor 360 and the serial link 381. (In contrast, if the machine is used to host third party applications, the service provider may have to relinquish a certain amount of control regarding the code that runs on CPU 520, since this will often come from, and potentially be managed by, the third party that supplies the application).

Once the BSC 560 has received the updated boot code (and an appropriate instruction to install it), the BSC asserts the reset signal on line 620 (step 730). This then prevents south bridge 550 from initiating any transactions on ISA bus 525, as previously described. At the same time, the BSC may also assert a reset signal into CPU 520 (using a reset link not shown in FIG. 6), which in due course will prompt a reboot of CPU 520. On the other hand, in some situations, the CPU 520 may be allowed to continue its current processing (although any operations involving south bridge 550 will of course now fail, since the south bridge is being held in reset).

With the bus master being held in reset, the BSC 560 now uses its output lines 601A and 601B to write the received boot code into flash memory 616 (step 740). As described above, this typically also involves ensuring that the signals from BSC 560 on bus 525 do not conflict with the south bridge 550, for example, by providing suitable buffering between the south bridge on one hand, and the flash memory 516 and BSC 560 on the other.

Once the boot code has been installed into flash memory 716, reset line 620 can be released (step 750). This therefore allows south bridge 550 to resume normal operations. If the BSC 560 has also been holding the CPU 520 in reset, then the CPU is likewise released at this point. This causes the CPU to directly re-boot using the updated boot code just stored into flash memory 516 (step 760). Alternatively, if the CPU was not being held in reset by BSC 560 during the boot code update, then the refreshed boot code from flash memory 516 is utilised when the CPU 520 is next caused to re-boot (again, step 760).

Figure 6A:
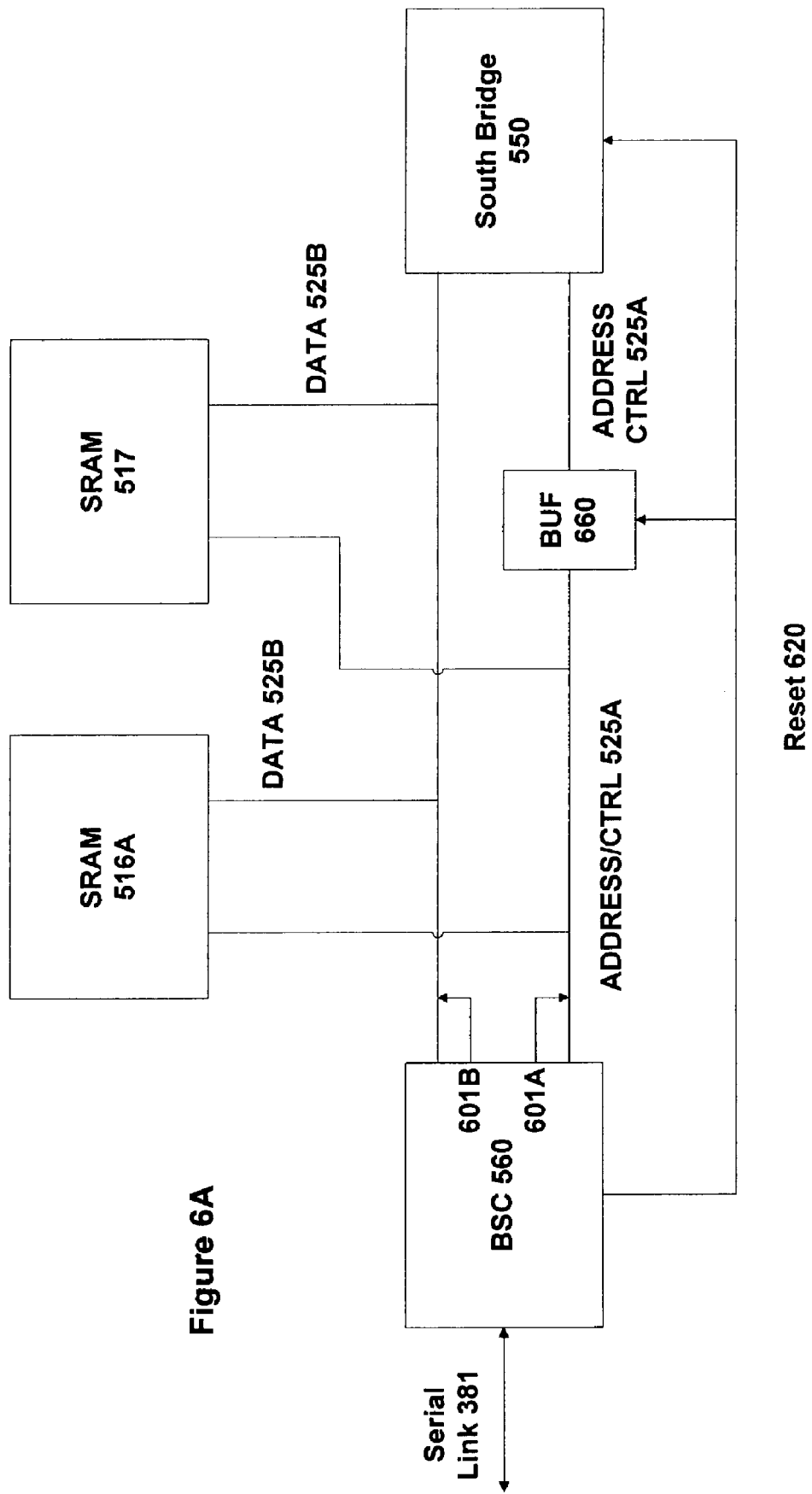

FIG. 6A illustrates a slight modification of the embodiment of FIG. 6, in which flash memory 516 has been replaced by static random access memory (SRAM) 516A. The advantage of using SRAM 516A compared to flash memory 516 is that SRAM is generally cheaper and also faster than flash memory.

Of course, SRAM 516A is volatile, and so any boot code stored within it is lost when the system is powered down. In a conventional system, this would be fatal, since such a system could not then boot up. However, in the embodiment of FIG. 6A, this can be readily accommodated by using the out-of-band mechanism involving BSC 560 to write the boot code into SRAM 516A.

Figure 7A:
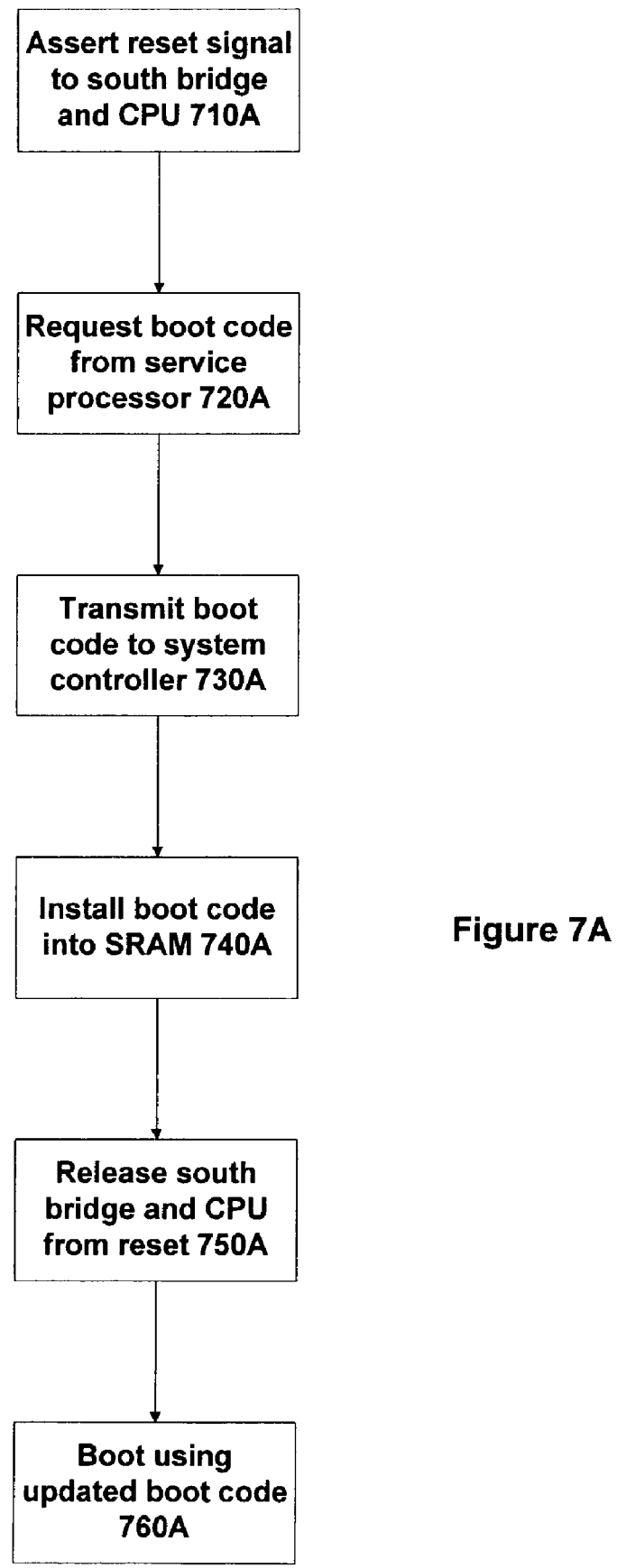

Thus in a typical power-on operation, as illustrated in the flowchart of FIG. 7A, BSC 560 initially holds south bridge 550 and CPU 520 in reset (step 710A). It then sends a request over serial link 381 to the service processor 360 for the boot code (step 720A). In response to this request, the service processor then transmits the boot code to the BSC 560 (step 730A). (Note that a user can typically configure the service processor in order to control which boot code is supplied to the system controller for one or more blades). The BSC now uses outputs 601A and 601B to write the boot code from service processor 360 into SRAM 516A (step 740A). When this has been completed, the reset signals to the south bridge 550 and to the CPU 520 can be released (step 750A). The CPU then boots up as normal (step 760A), accessing the boot code from SRAM 516A. Note that SRAM 516A is installed at the same location on ISA bus 525 as the flash memory 516 shown in FIG. 6.

Figure 8:
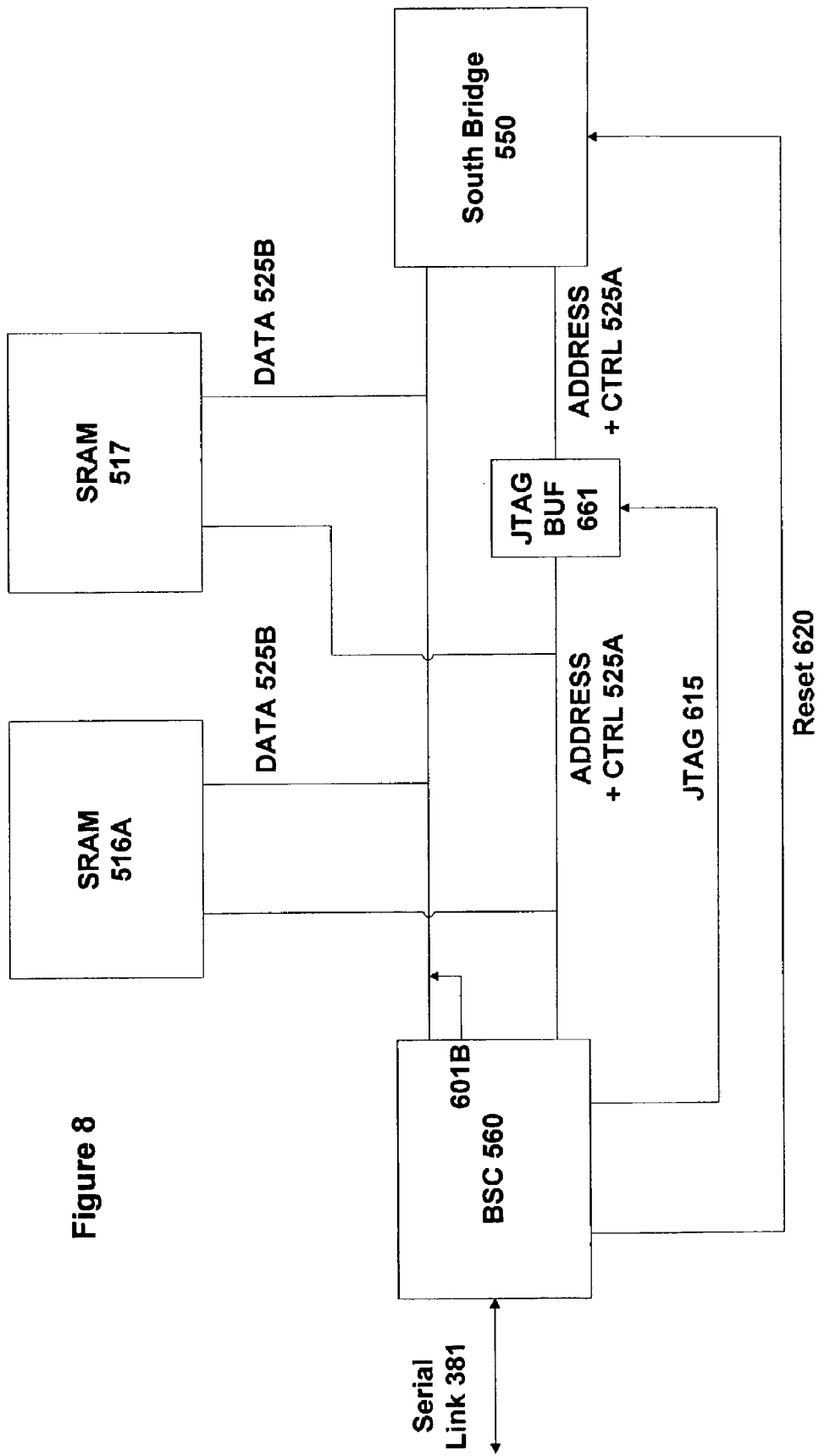
FIGS. 8 to 11 depict further alternative embodiments of the portion of the blade unit of FIG. 5 involved with the boot process.

FIG. 8 illustrates an alternative embodiment of the invention, which is generally similar to that of FIG. 6A, except that buffer 660 supports a JTAG interface (and is now shown in FIG. 8 as JTAG buffer 661). It will be appreciated that the JTAG interface provides a mechanism to read data from or insert data onto the I/O pins of a device, primarily for testing purpose. (The JTAG interface corresponds to IEEE standard 1149.1 and is known formally as the IEEE Standard Test Access Port and Boundary Scan Architecture, see for example the page /microelectronics/whitepapers/wpr-0018-01/ at the web site www.sun.com for more information on JTAG).

As also shown in FIG. 8, BSC 560 no longer has an additional output 601A for writing an address onto the address/control lines 525A of the ISA bus 525. Instead, a JTAG control link 615 is provided between the BSC 560 and the JTAG buffer 661. Using this link, BSC 560 can inject data onto the output of JTAG buffer 661, in accordance with standard JTAG operations. This therefore provides a way for BSC 560 to write address information onto address/control lines 525A. In other words, rather than the BSC directly writing address and control information onto the ISA bus 525, rather it sends the desired address and appropriate control instructions over JTAG control link 615 to JTAG 661, which responds to the instructions by outputting the desired address onto address/control lines 525A. At the same time, BSC 560 uses output 601B to write the corresponding data (i.e. boot code) onto data lines 525B. This data is then directed by the address from JTAG buffer 661 into the SRAM 516A.

Note that the operation of the embodiment of FIG. 8 is otherwise generally the same as that described for FIGS. 6 and 7. Thus prior to writing the boot code into SRAM 516A, BSC 560 asserts reset line 620 in order to prevent south bridge 550 using ISA bus 525. In addition, it sends a control command to JTAG buffer 661 that causes this buffer to isolate the south bridge 550 from the address signals written onto the address/control lines 525A of the ISA bus by JTAG buffer 661 under the control of the BSC 560. This therefore ensures that the possibility of any conflict with south bridge 550 from such bus operations is avoided.

Once the new boot code has been written into SRAM 516A using JTAG buffer 661 and BSC output 601B, then reset line 620 is released. This permits south bridge 550 to restart normal operations. (As before, this may involve an immediate re-boot of CPU 520, if this was also being held in reset). At the same time as the reset line 620 is released, the BSC 560 instructs the JTAG buffer 661 over JTAG control link 615 to go into a transparent mode, whereby the ISA bus 525 operates as if JTAG buffer 661 were not present.

An advantage of the embodiment of FIG. 8 over that of FIGS. 6 and 6A is that is simplifies somewhat the design of BSC 560. In particular, the output 601A on BSC 560 (see FIGS. 6 and 6A) requires twenty pins to write onto the address line 525A (assuming that bus 525 is an ISA bus), and it is relatively expensive to provide such a large number of pins. In contrast, JTAG control link 615 requires only four output pins on BSC 560.

Note that although the embodiment of FIG. 8 has SRAM 516A to store the boot code, this could also be replaced by flash memory 516 (analogous to the alternative embodiments of FIGS. 6 and 6A). It will also be appreciated that the embodiment of FIG. 8 is typically operable using the method of either FIG. 7 or FIG. 7A (depending upon whether flash memory 516 or SRAM 516A is utilised).

Figure 9:
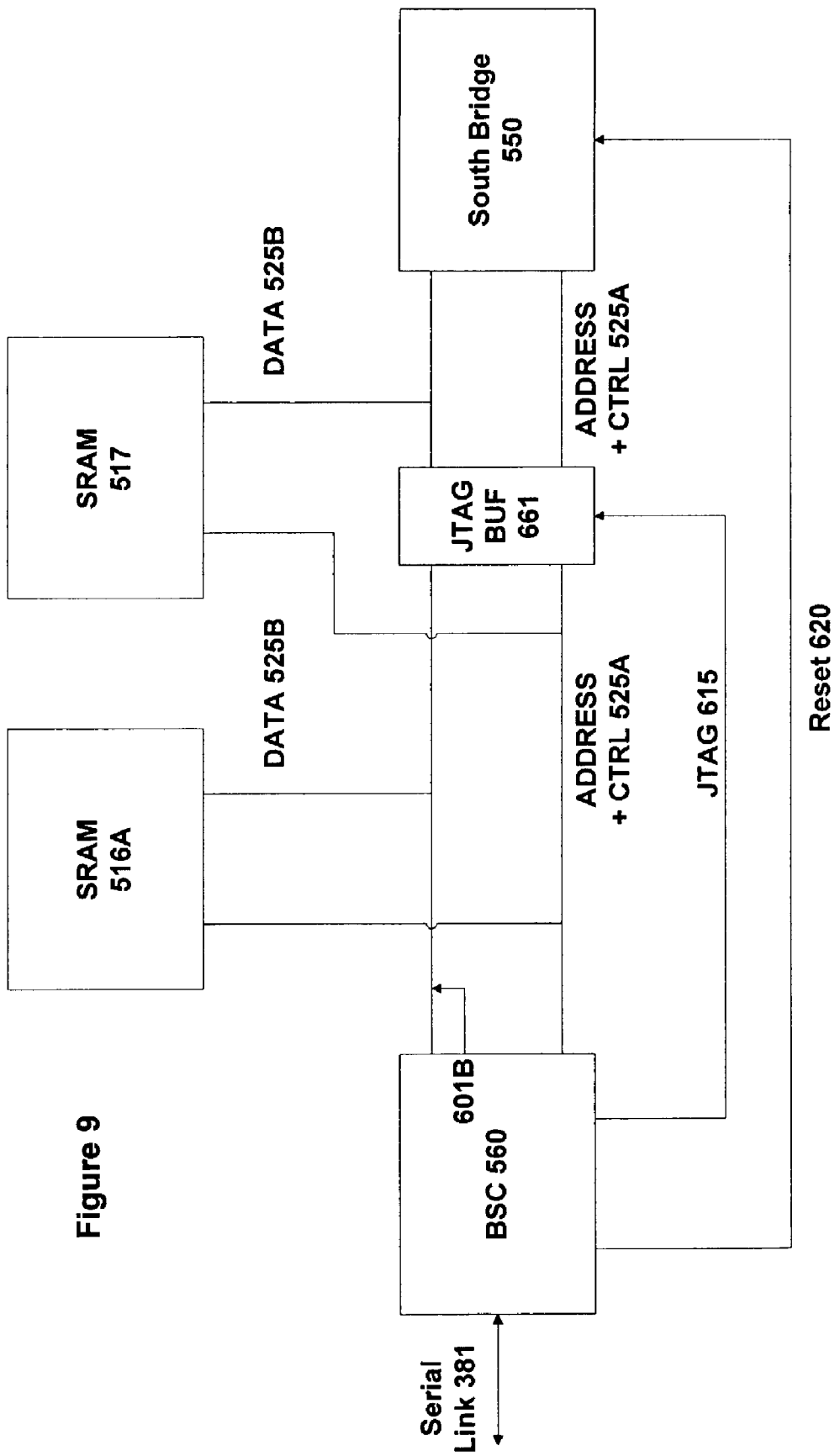

FIG. 9 shows a modification of the system of FIG. 8, in which JTAG buffer 661 now extends across both address/control lines 52A and also data lines 525B. In this embodiment, BSC 560 uses JTAG buffer 661 not only to specify the address and control signals for the bus transaction, but also the corresponding data. Accordingly, the additional BSC output 601B has now been dispensed with (compared to FIG. 8). Thus when BSC writes boot code into SRAM 516A, it again asserts reset line 620 and uses JTAG control link 615. However, this time not only are the address and control signals sent over JTAG control line 615 to JTAG buffer 661 for insertion onto ISA bus 525, but also the associated data signals as well.

This has the advantage of further simplifying BSC 560 and also reducing the number of output pins required on BSC 560 (down from 30 in the embodiment of FIG. 6 to just 4 to operate the JTAG control link 615). Otherwise however, the operation of the embodiment of FIG. 9 is generally the same as that described above in relation to the embodiments of FIGS. 6 and 8.

(It will be appreciated that JTAG buffer 661 may in fact be implemented by two separate JTAG buffers, one on address/control lines 525A and the other on data lines 525B. These two JTAG buffers would then be sequentially attached to the JTAG control link 615, in accordance with the standard JTAG configuration. Note also that SRAM 516A may be replaced if desired by flash memory 517, analogous again to the alternative embodiments of FIGS. 6 and 6A).

Figure 10:
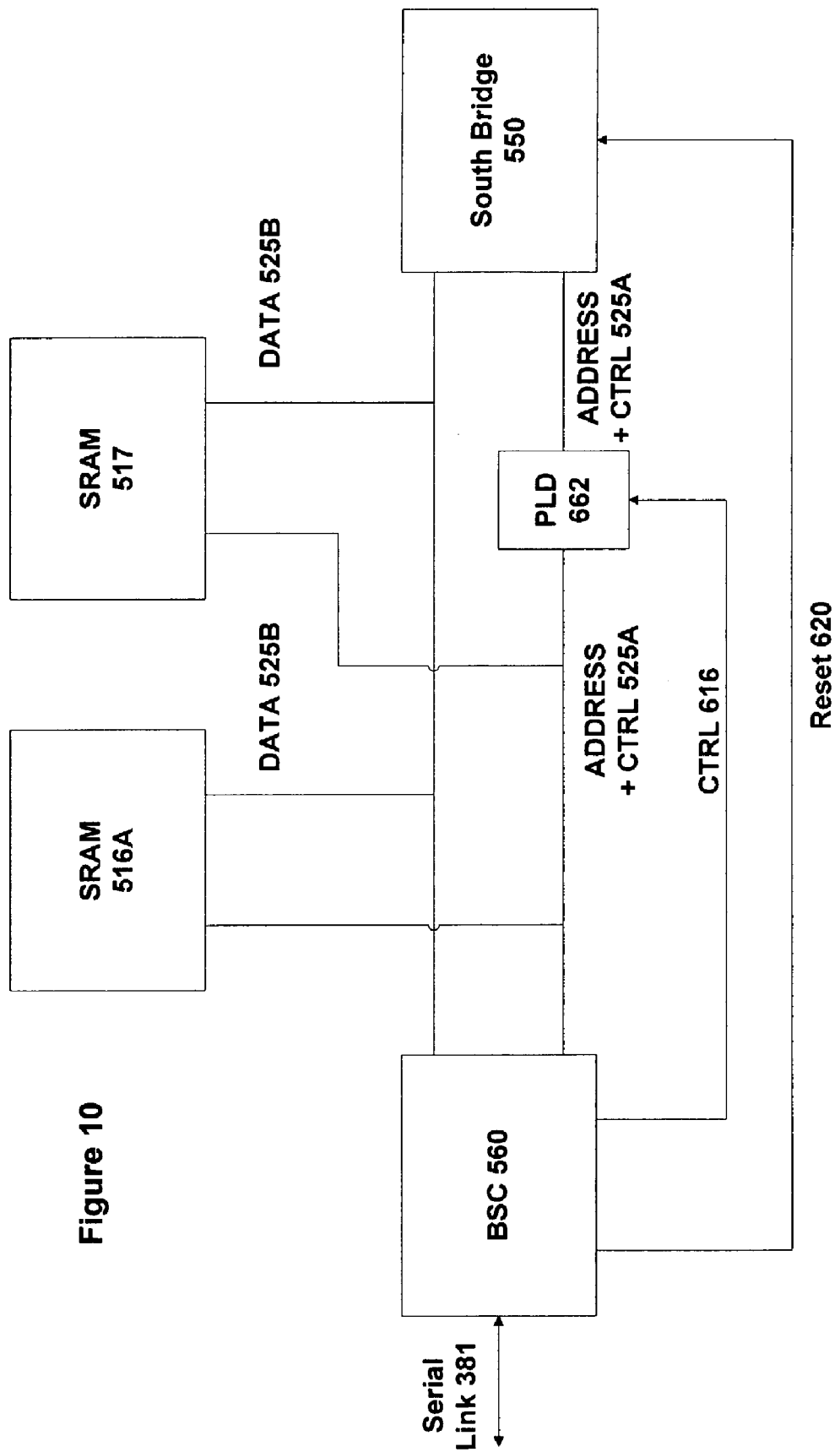

FIG. 10 shows a further embodiment of the invention, in which the JTAG buffer 661 of FIG. 8 has been replaced by a program logic device (PLD) 662. This may be implemented in various ways, for example as a fixed programmable gate array (FPGA), or as an application specific integrated circuit (ASIC), etc. The operation of PLD 662 is governed by control line 616 from BSC 560.

In normal operation, control line 616 specifies that PLD 662 operates so as to be transparent on ISA bus 525, in other words, signals on address/control lines 525A are simply passed straight through, as if the PLD 662 were not present. On the other hand, in order to update the boot code in SRAM 516A, the BSC 560 sends a command over control line 616 to PLD 662. This command specifies the address that the PLD 662 should insert onto address/control lines 525A. This address is then used to specify the destination of the data (i.e. boot code) that BSC 560 sends via output 601B onto the data lines 525B, thereby ensuring that it is directed to SRAM 516A.

In addition, PLD 662 is also designed to isolate south bridge 550 from the address and control signals that it inserts on to address/control lines 525A, in order to prevent any possible conflict with south bridge 550. In other words, the address from BSC 560 is only inserted by PLD 662 onto the portion of the address/control lines 525A between PLD 662 and SRAM 516A. In contrast, the portion of address/control lines 525A between PLD 662 and the south bridge 550 are not affected by this address, and so south bridge 550 is unaware of the operation to write data into SRAM 516A.

Note that other aspects of the operation of the embodiment of FIG. 10 are generally similar to that already described for previous embodiments (and as illustrated in FIGS. 7 and 7A). For example, the BSC 560 will be holding south bridge 550 in reset using line 620 while the boot code is being updated in this manner, and SRAM 516A may be replaced with flash memory 516. It is also assumed here that south bridge 550 has protected outputs on the data lines 525B (and so will avoid conflict with the signals from BSC 560 on output 601B), but not on address/control lines 525A (hence the need for isolation of these by the PLD 662 during the boot write operation).

Again, the approach of FIG. 10 has the advantage of saving pins on the BSC. Thus control line 616 may (in principle) be implemented on a single pin, although other implementations may choose to use some other (small) number of pins. Nevertheless, it will be appreciated that the number of pins for control line 616 is significantly less than the 20 pins required in the embodiment of FIG. 6 for output 601A (for an ISA bus).

Figure 11:
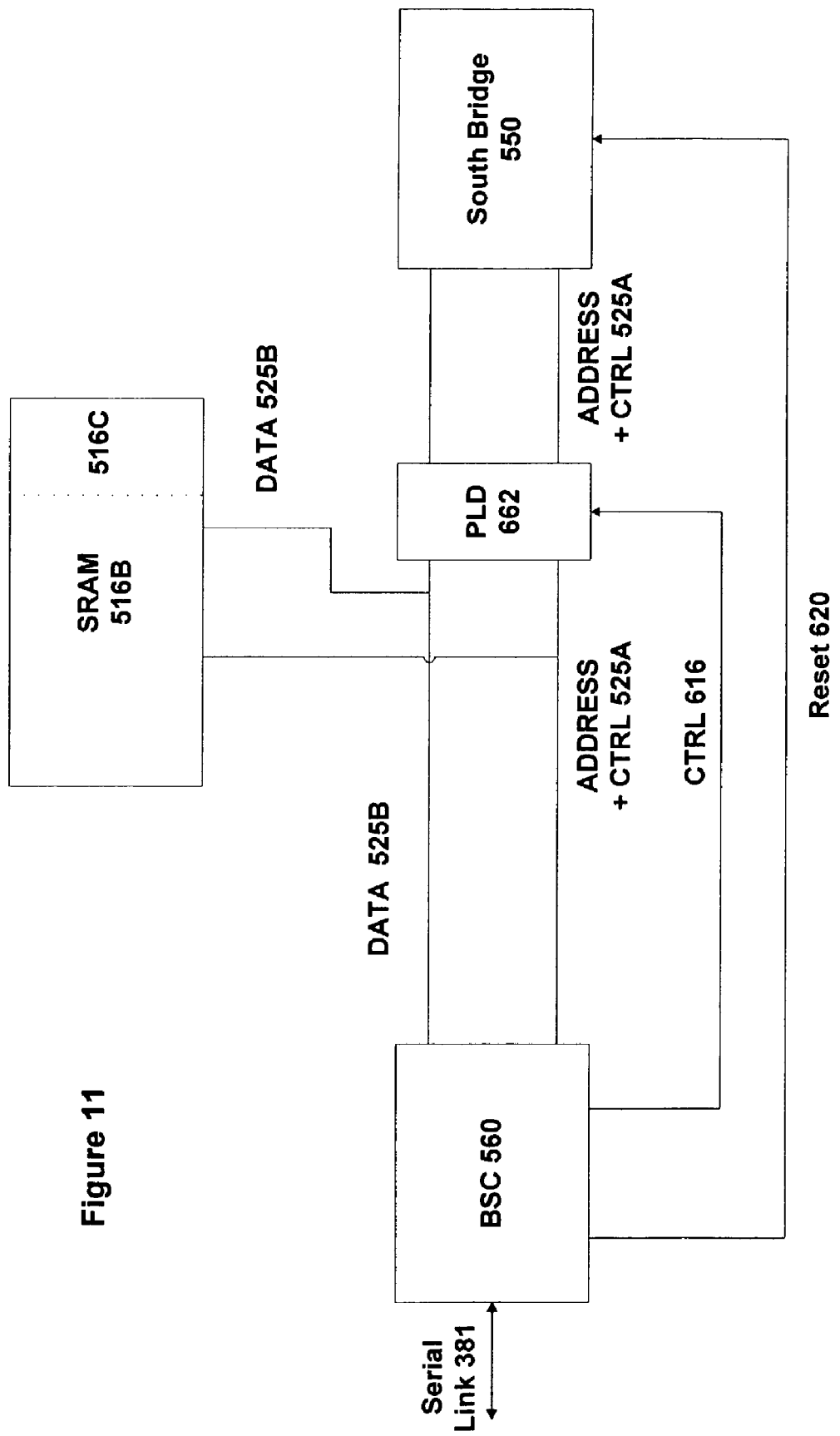

FIG. 11 illustrates a further embodiment of the invention, in which PLD 662 now extends across not only address/control lines 525A, but also data lines 525B. This therefore allows the BSC 560 to command the PLD 662 over control link 616 not only as regards the output for address and control lines 525A, but also for data lines 525B. This avoids the need for output 601B on BSC 560, and so provides additional pin savings (compared to the embodiment of FIG. 10).

Otherwise, the operation of the embodiment of FIG. 11 is largely as described for the previous embodiments, in that during reset mode, the BSC 560 uses control line 616 to inject data (i.e. boot code) and address signals onto ISA bus 525 via PLD 662, with the data then being written into SRAM 516B as per the address signals. At the same time PLD 662 isolates such signals from the south bridge 550, as least as regards the address/control lines 525A between the PLD 662 and the south bridge 550. (The PLD may optionally also isolate the corresponding portions of data lines 525B).

A further modification in FIG. 11 compared to the embodiment of FIG. 10 is that there is now only a single SRAM 516B. This serves both as storage for the boot code (i.e. analogous to SRAM 516A in FIG. 6), and also as a scratchpad for the boot code (i.e. analogous to SRAM 517 in FIG. 6). It will be appreciated that combining these two SRAMs into a single unit provides a simplification and a cost saving as regards the hardware in blade 40.

However, in order to accommodate this modification, it will be noted that in general the CPU 520 expects the boot code to be stored in one device, and the scratchpad to be available at a separate device. In other words, south bridge 550 (on behalf of the CPU) will normally expect SRAM 516A and SRAM 517 to have quite different addresses. Thus assuming that SRAM 516B in FIG. 11 is located at the expected location for the boot code store, then any transactions for this store will naturally go to SRAM 516B. However, commands from the south bridge 550 to access the scratchpad (i.e. SRAM 517 in FIG. 10) will be targeted at a nominally different device. Accordingly, PLD 662 is configured to intercept transactions from south bridge 550 intended for the scratchpad, and to modify the address portion of these signals so that they are instead passed to SRAM 516B (i.e. to the boot code storage device).

In one embodiment, the PLD provides hardware protection against write access (via the bus master) to the region of SRAM 516B used for storing the boot code. This then provides protection against the inadvertent corruption of the boot code.

The scratchpad region in SRAM 516B is generally separated in terms of address space from the boot code storage region. Thus a distinct region of SRAM 516B (indicated in FIG. 11 as region 516C) is utilised for the scratchpad, which helps to maintain compatibility with existing systems. Note that in one embodiment, the boot code storage region may occupy perhaps 1 Mbyte, while the scratchpad occupies only 256 Bytes, but it will be appreciated that these values will vary significantly from one embodiment to another.

Assuming therefore that the boot code in SRAM 516B is stored at its conventional location, in other words at the address that the CPU 520 expects, then the scratchpad region 516C must be located at a suitable offset from this. Consequently, when the PLD 662 modifies address signals for the scratchpad on line 525A, it does so by adding an increment equal to OFFSET1+OFFSET2. Here OFFSET1 represents the difference (positive or negative) in base address between the expected locations of the boot storage device and the scratchpad, as expected by the CPU, while OFFSET2 represents the offset of the scratchpad from the base of the boot storage (i.e. the location of region 516C within SRAM 516B).

It will be appreciated that in this approach, SRAM 516B is acting natively as the boot device 516A, and emulating the role of SRAM 517 (from FIG. 10). An alternative possibility is to adopt the converse arrangement, in which SRAM 516B is located at the standard address for the scratchpad, and the PLD 662 then allows SRAM 516B to emulate a boot storage device. This would be achieved in the same manner as previously described, namely those addresses for transactions directed at the boot device are diverted to SRAM 516B, and more particularly to an appropriate offset within SRAM 516B.

Note that if desired, the approach of using a single SRAM for both the boot code storage device and also the scratchpad could be adopted in the embodiment of FIG. 10, i.e. SRAM 516A and SRAM 517 could be combined in that embodiment into a single SRAM, with PLD 662 then being configured to perform the appropriate address modifications.

Although the approach described herein is typically intended for use in a computer system, it is applicable to a broad range of electronic apparatus having a microprocessor (i.e. CPU) that is invoked with stored boot code. It will be appreciated that this includes a wide variety of computing systems (mainframe, server, workstation, desktop, laptop, handheld, etc.), plus a range of electronic systems (e.g. telecommunications apparatus, household electronic devices, subsystems for transport devices such as cars and aeroplanes, and so on).

Thus while a variety of particular embodiments have been described in detail herein, it will be appreciated that this is by way of exemplification only. The skilled person will be aware of many further potential modifications and adaptations that fall within the scope of the claimed invention and its equivalents.

The invention claimed is:

1. Apparatus comprising:
a central processing unit (CPU);
a programmable memory including boot code at a predetermined location for use in booting the CPU;
a bus;
a bus master for the bus, wherein the CPU is configured to access the boot code via said bus and said bus master;
a buffer coupled to the bus, wherein the buffer is configured to support a JTAG interface; and
a system controller, wherein the system controller is operable to write boot code into the programmable memory over said bus.

2. The apparatus of claim 1, wherein the system controller includes an external control interface.

3. The apparatus of claim 2, wherein the external control interface comprises a serial link to a service processor, and wherein the system controller is configured to receive boot code to write into the programmable memory from the service processor.

4. The apparatus of claim 3, wherein the apparatus comprises said service processor and multiple subsystems, each subsystem comprising a CPU, a programmable memory, a bus, a bus master, and a system controller, and wherein the service processor is configured to transmit boot code to each system controller to write into the programmable memory of the respective subsystem.

5. The apparatus of claim 4, further comprising a configuration utility running on the service processor, wherein the configuration utility is configured to allow the simultaneous specification of boot code for multiple subsystems.

6. The apparatus of claim 1, further comprising a reset link between the system controller and the bus master, wherein the system controller is configured to use the reset link to hold the bus master in reset when writing boot code into the programmable memory over said bus.

7. The apparatus of claim 1, further comprising a reset link between the system controller and the CPU, wherein the system controller is configured to use the reset link to hold the CPU in reset when writing boot code into the programmable memory over said bus.

8. The apparatus of claim 1, wherein the buffer is configured to receive a control signal from the system controller, and wherein:
if the control signal has a first state, the presence of the buffer on the bus is transparent to the bus master and to other devices attached to the bus; and
if the control signal has a second state, the buffer is configured to isolate the bus master from at least some signals placed onto the bus by the system controller.

9. The apparatus of claim 1, wherein the buffer is not located on data lines of the bus.

10. The apparatus of claim 1, further comprising a JTAG control link from the system controller to the buffer, wherein the system controller is configured to transmit boot code to write into the programmable memory over said JTAG control link.

11. The apparatus of claim 1, further comprising a program logic device (PLD) incorporated into the bus.

12. The apparatus of claim 11, wherein the PLD includes a control link to the system controller for receiving a control signal to control the state of the PLD, and wherein in a first state, the PLD is configured to operate in such a manner that the presence of the PLD on the bus is transparent to the bus master and to other devices attached to the bus.

13. The apparatus of claim 12, wherein in a second state, the PLD is operable:
to receive boot code over the control link to the system controller, and to write the received boot code into the programmable memory over the bus; and
to isolate the bus master from at least some signals placed onto the bus by the PLD.

14. The apparatus of claim 11, wherein the PLD is not located on data lines of the bus.

15. The apparatus of claim 11, wherein the programmable memory comprises static random access memory (SRAM).

16. The apparatus of claim 15, wherein said SRAM is also configured to serve as scratchpad memory for use by the CPU during booting.

17. The apparatus of claim 16, wherein the PLD is operable to redirect bus transactions for the scratchpad memory to the SRAM.

18. The apparatus of claim 17, wherein the redirection of bus transactions is performed by adding a fixed increment to the address of transactions intended for the scratchpad memory.

19. The apparatus of claim 18, wherein said fixed increment comprises a combination of:
a first offset representative of an offset of a base address of the SRAM from an expected base address of the scratchpad; and a second offset representative of an offset of a region of the SRAM allocated to serve as the scratchpad from the base address of the SRAM.

20. The apparatus of claim 1, wherein said programmable memory comprises an SRAM that is also configured to serve as a scratchpad memory for use by the CPU during booting.

21. The apparatus of claim 20, wherein said SRAM is divided into two regions, a first region for storing boot code and a second region for use as the scratchpad memory.

22. The apparatus of claim 21, wherein transactions on the bus intended for the scratchpad are diverted to said second region.

23. Apparatus comprising a service processor and multiple computing subsystems, each subsystem including:
a central processing unit (CPU);
a programmable memory including boot code at a predetermined location for use in booting the CPU;
a bus;
a bus master for the bus, wherein the CPU is configured to access the boot code via said bus and said bus master;
a buffer coupled to the bus, wherein the buffer is configured to support a JTAG interface; and
a system controller, wherein the system controller is operable to receive boot code from the service processor and to write the received boot code into the programmable memory of the subsystem over said bus.

24. The apparatus of claim 23, further comprising a configuration utility running on the service processor, wherein the configuration utility is configured to allow the simultaneous specification of boot code for multiple subsystems.

25. The apparatus of claim 23, further comprising in each subsystem a reset link between the system controller and the bus master, wherein the system controller is configured to use the reset link to hold the bus master in reset when writing boot code into the programmable memory over said bus.

26. The apparatus of claim 23, further comprising in each subsystem a reset link between the system controller and the CPU, wherein the system controller is configured to use the reset link to hold the CPU in reset when writing boot code into the programmable memory over said bus.

27. The apparatus of claim 23, wherein the buffer is operable to receive a control signal from the system controller, and wherein:
if the control signal has a first state, the presence of the buffer on the bus is transparent to the bus master and to other devices attached to the bus; and
if the control signal has a second state, the buffer is configured to isolate the bus master from at least some signals placed onto the bus by the system controller.

28. The apparatus of claim 27, wherein the buffer is not located on data lines of the bus.

29. The apparatus of claim 27, further comprising a JTAG control link from the system controller to the buffer, and wherein the system controller is configured to transmit boot code over said JTAG control link to write into the programmable memory over said bus.

30. The apparatus of claim 23, further comprising in each subsystem a program logic device (PLD) incorporated into the bus, wherein the PLD includes a control link to the system controller for receiving a control signal to control the state of the PLD, and wherein in a first state, the PLD is configured to operate in such a manner that the presence of the PLD on the bus is transparent to the bus master and to other devices attached to the bus.

31. The apparatus of claim 30, wherein in a second state, the PLD is operable to receive boot code over the control link to the system controller, and to write the received boot code into the programmable memory over the bus.

32. The apparatus of claim 30, wherein the PLD is not located on data lines of the bus.

33. Apparatus comprising:
a central processing unit (CPU);
a bus; and
single-port static random access memory (SRAM) attached to the bus;
wherein the apparatus is configured for the CPU to boot by accessing over said bus boot code stored at a predetermined location within said SRAM; and
wherein the SRAM is also configured to serve as a scratchpad memory for use by the CPU during booting, wherein said SRAM is divided into two regions, a first region for storing boot code and a second region for use as the scratchpad memory.

34. A method of operating apparatus comprising a central processing unit (CPU), a programmable memory, a bus, a bus master for the bus, a buffer coupled to the bus, and a system controller, wherein the buffer is configured to support a JTAG interface and includes a JTAG control link from the system controller, the method comprising:
the system controller transmitting, over the JTAG control link to the buffer, boot code to write into a predetermined location of the programmable memory over said bus; and
the CPU accessing the boot code from the programmable memory via the bus master and the bus in order to boot up.

35. The method of claim 34, further comprising the system controller receiving boot code to write into the programmable memory over a serial link to a service processor.

36. The method of claim 34, further comprising the system controller holding the bus master in reset when writing boot code into the programmable memory over said bus.

37. The method of claim 34, further comprising the system controller holding the CPU in reset when writing boot code into the programmable memory over said bus.

38. The method of claim 34, further comprising:
receiving a control signal at the buffer from the system controller, and,
responsive to the control signal having a first state, operating the buffer so that its presence on the bus is transparent to the bus master and to other devices attached to the bus; and
responsive to the control signal having a second state, operating the buffer to isolate the bus master from at least some signals placed onto the bus by the system controller.

39. The method of claim 34, wherein a program logic device (PLD) is incorporated into the bus, said PLD having a control link to the system controller, and further comprising:
receiving a signal at the PLD from the system controller over the control link to control the state of the PLD, and responsive to a first control state being signalled, operating the PLD in such a manner that the presence of the PLD on the bus is transparent to the bus master and to other devices attached to the bus,
and responsive to a second control state being signalled, receiving boot code over the control link to the system controller, and writing the received boot code into the programmable memory over the bus.

40. The method of claim 34, wherein said programmable memory comprises an SRAM, further comprising using the SRAM as scratchpad memory for use by the CPU during booting.

41. The method of claim 40, further comprising logically dividing said SRAM into two regions, a first region for storing boot code and a second region for use as the scratchpad memory.

42. The method of claim 41, wherein transactions on the bus intended for the scratchpad are diverted to said second region.

43. The method of claim 42, providing a PLD coupled to the bus to perform the diversion of transactions intended for the scratchpad to said second region.

44. The method of claim 43, wherein the diversion is performed by the PLD by adding an increment to an address of the bus transaction, said increment being formed from the combination of:
   a first offset representative of an offset of a base address of the SRAM from an expected base address of the scratchpad; and
   a second offset representative of an offset of a region of the SRAM allocated to serve as the scratchpad from the base address of the SRAM.

45. A method of operating apparatus comprising a service processor and multiple computing subsystems, each subsystem including a central processing unit (CPU), a programmable memory, a bus, a bus master for the bus, a buffer coupled to the bus, and a system controller, wherein the buffer is configured to support a JTAG interface and includes a JTAG control link from the system controller, the method comprising:
   the service processor transmitting boot code to each of the system controllers;
   the system controller transmitting, over the JTAG control link to the buffer, boot code to write into a predetermined location of the programmable memory of the subsystem over said bus; and
   the CPU accessing the boot code from the programmable memory via the bus master and the bus in order to boot the CPU.

46. The method of claim 45, further comprising running a configuration utility on the service processor, and using the configuration utility to specify the boot code for multiple subsystems using a single operation.

47. The method of claim 45, further comprising the system controller holding the bus master in reset when writing boot code into the programmable memory over said bus.

48. The method of claim 45, further comprising the system controller holds the CPU in reset until the boot code has been written into the programmable memory over said bus.

49. A computer program product comprising instructions in machine readable form on a storage medium, said instructions being loadable into a service processor in an apparatus comprising multiple computing subsystems, each subsystem including a central processing unit (CPU), a programmable memory, a bus, a bus master for the bus, a buffer coupled to the bus, and a system controller, wherein the buffer is configured to support a JTAG interface and includes a JTAG control link from the system controller, the instructions causing the service processor to perform the method of:
   running a configuration utility to specify the boot code for the multiple subsystems using a single operation;
   transmitting the specified boot code from the service processor to each of the system controllers;
   and instructing the system controllers to transmit, over the JTAG control link to the buffer, the received boot code to write into a predetermined location of the programmable memory of the subsystem over said bus, so that the boot code is accessible by the CPU from the programmable memory via the bus master and the bus in order to boot the CPU.

50. The computer program product of claim 49, wherein said instructions further cause the service processor to send a reset signal to each of the system controllers, said reset signal causing the CPU of that subsystem to re-boot.

51. Apparatus comprising:
   a central processing unit (CPU);
   a programmable memory including boot code at a predetermined location for use in booting the CPU;
   a bus;
   a bus master for the bus, wherein the CPU is configured to access the boot code via said bus and said bus master; and
   a system controller, wherein the system controller is operable to write boot code into the programmable memory over said bus;
   wherein said programmable memory includes a memory configured to serve as a scratchpad memory for use by the CPU during booting, wherein said memory is divided into two regions, a first region for storing boot code and a second region for use as the scratchpad memory.

52. The apparatus of claim 51, wherein said memory is static random access memory (SRAM).

53. The apparatus of claim 51, wherein transactions on the bus intended for the scratchpad are diverted to said second region.

54. Apparatus comprising:
   a central processing unit (CPU);
   a programmable memory including boot code at a predetermined location for use in booting the CPU;
   a bus;
   a bus master for the bus, wherein the CPU is configured to access the boot code via said bus and said bus master;
   a program logic device (PLD) coupled to the bus; and
   a system controller, wherein the system controller is operable to write boot code into the programmable memory over said bus;
   wherein said programmable memory includes static random access memory (SRAM) configured to serve as a scratchpad memory for use by the CPU during booting;
   wherein the PLD is operable to redirect bus transactions for the scratchpad memory to the SRAM.

55. The apparatus of claim 54, wherein the redirection of bus transactions is performed by adding a fixed increment to the address of transactions intended for the scratchpad memory.

56. The apparatus of claim 55, wherein said fixed increment comprises a combination of:
   a first offset representative of an offset of a base address of the SRAM from an expected base address of the scratchpad; and
   a second offset representative of an offset of a region of the SRAM allocated to serve as the scratchpad from the base address of the SRAM.

* * * * *